United States Patent
Wood et al.

(10) Patent No.: US 9,426,208 B2
(45) Date of Patent: *Aug. 23, 2016

(54) MEDIA ACQUISITION, PROCESSING AND DISTRIBUTION SYSTEM FOR THE INTERNET

(71) Applicant: Summit 6 LLC, Dallas, TX (US)

(72) Inventors: Lisa T. Wood, Danville, CA (US); Scott M. Lewis, Danville, CA (US); Robin Fried, Praha 2 (CZ)

(73) Assignee: Summit 6 LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,917

(22) Filed: Dec. 13, 2012

(65) Prior Publication Data
US 2013/0227079 A1    Aug. 29, 2013

Related U.S. Application Data

(63) Continuation of application No. 12/790,442, filed on May 28, 2010, now Pat. No. 8,392,532, which is a continuation of application No. 11/935,340, filed on Nov. 5, 2007, now Pat. No. 7,761,537, which is a
(Continued)

(51) Int. Cl.
*G06F 15/16* (2006.01)
*H04L 29/08* (2006.01)
(Continued)

(52) U.S. Cl.
CPC ......... *H04L 67/10* (2013.01); *H04L 29/06027* (2013.01); *H04L 65/4084* (2013.01);
(Continued)

(58) Field of Classification Search
CPC ....... H04L 67/02; H04L 67/06; H04L 67/10; H04L 67/1095; H04L 65/602; H04L 65/607; H04L 65/4084
See application file for complete search history.

(56) References Cited

U.S. PATENT DOCUMENTS 4,802,008 A    1/1989 Walling
4,862,200 A    8/1989 Hicks
(Continued)

FOREIGN PATENT DOCUMENTS

EP    0838774 A2    4/1998
EP    0930774 A2    7/1999
(Continued)

OTHER PUBLICATIONS

Part 2 of Appendix to Defendants Samsung Electronics Co., Ltd. and Samsung Telecommunications America, LLC'S Post-Trial Brief Regarding Unenforceability of the '482 Patent Due to Inequitable Conduct, May 20, 2013.
(Continued)

*Primary Examiner* — Wen-Tai Lin
(74) *Attorney, Agent, or Firm* — Duane S. Kobayashi

(57) ABSTRACT

The present invention, generally speaking, provides a broad-based solution for acquisition, processing and distribution of media objects including pictures (images), movies, videos, graphics, sound clips, etc via the Internet or the like. And specifically, it is a solution to such systems for use in applications wherein there are multiple originators of media objects that will be viewed in multiple web sites having different viewing requirements. A browser-based prepare and post tool prepares and submits media objects from inside a standard browser to a remote server. A Media Acquisition, Processing and Distribution (MAPD) system receives these media objects, processes them to meet specific requirements, and delivers them for integration into remote databases. MAPD system services include media object submission, processing, hosting and mirroring. The hosting service delivers a media object URL to a remote database, allowing the media object to be requested and served by the media object server. The mirroring service delivers the actual media object to multi-point remote databases to be stored and served by the customer.

15 Claims, 8 Drawing Sheets

MIRROR Service Transaction Flow

Related U.S. Application Data continuation of application No. 10/736,285, filed on Dec. 15, 2003, now Pat. No. 7,313,604, which is a continuation of application No. 09/440,461, filed on Nov. 15, 1999, now Pat. No. 6,732,162.

(51) Int. Cl.
  *H04L 29/06* (2006.01)
  *G06G 7/00* (2006.01)

(52) U.S. Cl.
  CPC .......... *H04L65/602* (2013.01); *H04L 65/607* (2013.01); *H04L 67/06* (2013.01); *H04L 67/1095* (2013.01); *H04L 67/02* (2013.01); *Y10S 707/99932* (2013.01); *Y10S 707/99942* (2013.01)

(56) References Cited

U.S. PATENT DOCUMENTS

| | | |
|---|---|---|
| 5,001,628 A | 3/1991 | Johnson et al. |
| 5,063,587 A | 11/1991 | Semasa et al. |
| 5,179,637 A | 1/1993 | Nardozzi |
| 5,235,680 A | 8/1993 | Bijnagte |
| 5,327,265 A | 7/1994 | McDonald |
| 5,404,316 A | 4/1995 | Klingler et al. |
| 5,477,353 A | 12/1995 | Yamasaki |
| 5,479,206 A | 12/1995 | Ueno |
| 5,493,677 A | 2/1996 | Balogh et al. |
| 5,555,388 A | 9/1996 | Shaughnessy |
| 5,606,365 A | 2/1997 | Maurimus et al. |
| 5,608,542 A | 3/1997 | Krahe et al. |
| 5,636,294 A | 6/1997 | Grosse et al. |
| 5,666,159 A | 9/1997 | Parulski et al. |
| 5,666,215 A | 9/1997 | Fredlund et al. |
| 5,675,507 A | 10/1997 | Bobo, II |
| 5,678,046 A | 10/1997 | Cahill et al. |
| 5,694,546 A | 12/1997 | Reisman |
| 5,696,850 A | 12/1997 | Parulski et al. |
| 5,706,457 A | 1/1998 | Dwyer et al. |
| 5,715,397 A | 2/1998 | Ogawa et al. |
| 5,729,741 A | 3/1998 | Liaguno et al. |
| 5,748,194 A | 5/1998 | Chen |
| 5,751,950 A | 5/1998 | Crisan |
| 5,754,172 A | 5/1998 | Kubota et al. |
| 5,760,916 A | 6/1998 | Dellert et al. |
| 5,760,917 A | 6/1998 | Sheridan |
| 5,761,404 A | 6/1998 | Murakami et al. |
| 5,761,601 A | 6/1998 | Nemirofsky et al. |
| 5,764,235 A | 6/1998 | Hunt et al. |
| 5,765,152 A | 6/1998 | Erickson |
| 5,774,670 A | 6/1998 | Montulli |
| 5,778,164 A | 7/1998 | Watkins et al. |
| 5,778,198 A | 7/1998 | Kadota |
| 5,778,430 A | 7/1998 | Ish et al. |
| 5,781,725 A | 7/1998 | Saito |
| 5,781,773 A | 7/1998 | Vanderpool et al. |
| 5,781,901 A | 7/1998 | Kuzma |
| 5,787,459 A | 7/1998 | Stallmo et al. |
| 5,787,466 A | 7/1998 | Berliner |
| 5,790,708 A | 8/1998 | Delean |
| 5,794,217 A | 8/1998 | Allen |
| 5,799,063 A | 8/1998 | Krane |
| 5,802,312 A | 9/1998 | Laziridis et al. |
| 5,802,314 A | 9/1998 | Tullis et al. |
| 5,802,518 A | 9/1998 | Karaev et al. |
| 5,806,005 A | 9/1998 | Hull et al. |
| 5,809,280 A | 9/1998 | Chard et al. |
| 5,813,009 A | 9/1998 | Johnson et al. |
| 5,819,032 A | 10/1998 | De Vries et al. |
| 5,819,092 A | 10/1998 | Ferguson et al. |
| 5,835,627 A | 11/1998 | Higgins |
| 5,835,735 A | 11/1998 | Mason et al. |
| 5,844,969 A | 12/1998 | Goldman et al. |
| 5,845,299 A | 12/1998 | Arora et al. |
| 5,848,415 A | 12/1998 | Guck |
| 5,852,435 A | 12/1998 | Vigneaux et al. |
| 5,859,956 A | 1/1999 | Sugiyama et al. |
| 5,864,632 A | 1/1999 | Ogawa |
| 5,875,296 A | 2/1999 | Shi et al. |
| 5,880,740 A | 3/1999 | Halliday et al. |
| 5,890,170 A | 3/1999 | Sidana |
| 5,890,213 A | 3/1999 | Sokolov |
| 5,897,622 A | 4/1999 | Binn et al. |
| 5,903,277 A | 5/1999 | Sutherland et al. |
| 5,903,728 A | 5/1999 | Semenzato |
| 5,907,640 A | 5/1999 | Delean |
| 5,911,776 A | 6/1999 | Guck |
| 5,913,088 A | 6/1999 | Moghadam et al. |
| 5,918,213 A | 6/1999 | Bernard et al. |
| 5,923,846 A | 7/1999 | Gage et al. |
| 5,926,116 A | 7/1999 | Kitano et al. |
| 5,926,288 A | 7/1999 | Dellert et al. |
| 5,933,600 A | 8/1999 | Shieh et al. |
| 5,933,646 A | 8/1999 | Hendrickson et al. |
| 5,937,232 A | 8/1999 | Taguchi et al. |
| 5,953,488 A | 9/1999 | Seto |
| 5,956,716 A | 9/1999 | Kenner et al. |
| 5,960,411 A | 9/1999 | Hartman et al. |
| 5,974,401 A | 10/1999 | Enomoto et al. |
| 6,005,613 A | 12/1999 | Endsley |
| 6,006,231 A | 12/1999 | Popa |
| 6,012,068 A | 1/2000 | Boezeman et al. |
| 6,017,157 A | 1/2000 | Garfinkle et al. |
| 6,018,774 A | 1/2000 | Mayle et al. |
| 6,023,241 A | 2/2000 | Clapper |
| 6,026,431 A | 2/2000 | Hinrichs |
| 6,028,603 A | 2/2000 | Wang et al. |
| 6,035,323 A | 3/2000 | Narayen et al. |
| 6,038,295 A | 3/2000 | Mattes |
| 6,058,399 A | 5/2000 | Morag et al. |
| 6,058,417 A | 5/2000 | Hess et al. |
| 6,058,428 A | 5/2000 | Wang et al. |
| 6,075,528 A | 6/2000 | Curtis |
| 6,076,111 A | 6/2000 | Chiu et al. |
| 6,084,581 A | 7/2000 | Hunt |
| 6,085,195 A | 7/2000 | Hoyt et al. |
| 6,085,249 A | 7/2000 | Wang et al. |
| 6,088,732 A | 7/2000 | Smith et al. |
| 6,092,078 A | 7/2000 | Adolfsson |
| 6,092,114 A | 7/2000 | Shaffer et al. |
| 6,094,684 A | 7/2000 | Pallmann |
| 6,097,389 A | 8/2000 | Morris et al. |
| 6,104,468 A | 8/2000 | Bryniarski et al. |
| 6,118,480 A | 9/2000 | Anderson et al. |
| 6,119,101 A | 9/2000 | Peckover |
| 6,125,352 A | 9/2000 | Franklin et al. |
| 6,128,600 A | 10/2000 | Imamura et al. |
| 6,128,655 A | 10/2000 | Fields et al. |
| 6,133,985 A | 10/2000 | Garfinkle et al. |
| 6,167,382 A | 12/2000 | Sparks et al. |
| 6,167,442 A | 12/2000 | Sutherland et al. |
| 6,167,469 A | 12/2000 | Safai et al. |
| 6,167,568 A | 12/2000 | Gandel et al. |
| 6,177,934 B1 | 1/2001 | Sugiura et al. |
| 6,182,116 B1 | 1/2001 | Namma et al. |
| 6,182,279 B1 | 1/2001 | Buxton |
| 6,189,008 B1 * | 2/2001 | Easty et al. |
| 6,199,082 B1 | 3/2001 | Ferrel et al. |
| 6,202,061 B1 | 3/2001 | Khosla et al. |
| 6,223,190 B1 | 4/2001 | Aihara et al. |
| 6,226,618 B1 | 5/2001 | Downs et al. |
| 6,233,590 B1 | 5/2001 | Shaw et al. |
| 6,233,600 B1 | 5/2001 | Salas et al. |
| 6,237,010 B1 | 5/2001 | Hui et al. |
| 6,253,216 B1 | 6/2001 | Sutcliffe et al. |
| 6,266,681 B1 | 7/2001 | Guthrie |
| 6,275,829 B1 | 8/2001 | Angiulo et al. |
| 6,281,874 B1 | 8/2001 | Sivan et al. |
| 6,282,549 B1 | 8/2001 | Hoffert |
| 6,289,115 B1 | 9/2001 | Takeo |
| 6,301,586 B1 | 10/2001 | Yang et al. |
| 6,301,607 B2 | 10/2001 | Barraclough et al. |
| 6,308,188 B1 | 10/2001 | Bernardo et al. |

(56) References Cited

U.S. PATENT DOCUMENTS

| | | |
|---|---|---|
| 6,320,588 B1 | 11/2001 | Palmer et al. |
| 6,320,672 B1 | 11/2001 | Itoh |
| 6,324,538 B1 | 11/2001 | Wesinger et al. |
| 6,324,545 B1 | 11/2001 | Morag |
| 6,327,049 B1 | 12/2001 | Ohtsuka |
| 6,330,572 B1 | 12/2001 | Sitka |
| 6,330,575 B1 | 12/2001 | Moore et al. |
| 6,343,302 B1 | 1/2002 | Graham |
| 6,353,445 B1 | 3/2002 | Babula et al. |
| 6,370,193 B1 | 4/2002 | Lee |
| 6,374,260 B1 | 4/2002 | Hoffert et al. |
| 6,381,029 B1 | 4/2002 | Tipirneni |
| 6,385,596 B1 | 5/2002 | Wiser et al. |
| 6,421,429 B1 | 7/2002 | Merritt et al. |
| 6,424,429 B1 | 7/2002 | Takahashi et al. |
| 6,456,591 B1 | 9/2002 | Mishra |
| 6,489,954 B1 | 12/2002 | Powlette |
| 6,489,980 B1 | 12/2002 | Scott et al. |
| 6,501,472 B1 | 12/2002 | Hunt et al. |
| 6,502,194 B1 | 12/2002 | Berman et al. |
| 6,505,160 B1 | 1/2003 | Levy et al. |
| 6,510,418 B1 | 1/2003 | Case et al. |
| 6,513,069 B1 | 1/2003 | Abato et al. |
| 6,516,340 B2 | 2/2003 | Boys |
| 6,519,046 B1 | 2/2003 | Kinjo |
| 6,519,632 B1 | 2/2003 | Brackett et al. |
| 6,522,418 B2 | 2/2003 | Yokomizo et al. |
| 6,532,079 B1 | 3/2003 | Serex et al. |
| 6,535,294 B1 | 3/2003 | Arledge et al. |
| 6,535,296 B1 | 3/2003 | Oak |
| 6,539,420 B1 | 3/2003 | Fields et al. |
| 6,542,936 B1 | 4/2003 | Mayle et al. |
| 6,567,122 B1 | 5/2003 | Anderson et al. |
| 6,567,983 B1 | 5/2003 | Shiimori |
| 6,571,271 B1 | 5/2003 | Savitzky et al. |
| 6,583,799 B1 | 6/2003 | Manolis et al. |
| 6,621,938 B1 | 9/2003 | Tanaka et al. |
| 6,628,417 B1 | 9/2003 | Naito et al. |
| 6,657,702 B1 | 12/2003 | Chui et al. |
| 6,690,417 B1 | 2/2004 | Yoshida et al. |
| 6,693,635 B1 | 2/2004 | Yokomizo |
| 6,711,297 B1 | 3/2004 | Chang et al. |
| 6,718,340 B1 | 4/2004 | Hartman et al. |
| 6,721,802 B1 | 4/2004 | Wright et al. |
| 6,732,162 B1 | 5/2004 | Wood et al. |
| 6,799,165 B1 | 9/2004 | Boesjes |
| 6,853,461 B1 | 2/2005 | Shiimori |
| 6,871,231 B2 | 3/2005 | Morris |
| 6,895,557 B1 | 5/2005 | Wood et al. |
| 6,930,709 B1 | 8/2005 | Creamer et al. |
| 7,010,587 B1 | 3/2006 | Shiimori |
| 7,024,456 B1 | 4/2006 | Simonoff |
| 7,032,030 B1 | 4/2006 | Codignotto |
| 7,036,081 B2 | 4/2006 | Powlette |
| 7,038,713 B1 | 5/2006 | Matama |
| 7,043,527 B2 | 5/2006 | Shiimori et al. |
| 7,146,575 B2 | 12/2006 | Manolis et al. |
| 7,158,172 B2 | 1/2007 | Kawaoka et al. |
| 7,246,147 B2 | 7/2007 | Kim et al. |
| 7,257,158 B1 | 8/2007 | Figueredo et al. |
| 7,263,497 B1 | 8/2007 | Wiser et al. |
| 7,280,702 B2 | 10/2007 | Chang et al. |
| 7,308,413 B1 | 12/2007 | Tota et al. |
| 7,313,604 B2 | 12/2007 | Wood et al. |
| 7,315,386 B1 | 1/2008 | Shiimori et al. |
| 7,509,270 B1 | 3/2009 | Hendricks et al. |
| 7,624,344 B2 | 11/2009 | Mindrum et al. |
| 7,761,537 B2 | 7/2010 | Wood et al. |
| 7,765,482 B2 | 7/2010 | Wood et al. |
| 8,001,218 B2 | 8/2011 | Wood et al. |
| 8,175,420 B2 | 5/2012 | Sposato et al. |
| 8,392,532 B2 | 3/2013 | Wood et al. |
| 2002/0067500 A1 | 6/2002 | Yokomizo et al. |
| 2002/0091725 A1 | 7/2002 | Skok |
| 2004/0039795 A1 | 2/2004 | Percival |
| 2005/0239454 A1 | 10/2005 | Kawashima et al. |
| 2005/0262437 A1 | 11/2005 | Patterson et al. |
| 2008/0201236 A1 | 8/2008 | Field et al. |

FOREIGN PATENT DOCUMENTS

| | | |
|---|---|---|
| EP | 1076302 A1 | 2/2001 |
| JP | 8-153183 | 6/1996 |
| JP | 11-69072 | 3/1999 |
| JP | 11-184943 | 7/1999 |
| WO | WO 97/04353 A1 | 2/1997 |
| WO | WO 97/39580 A1 | 10/1997 |
| WO | WO 98/11728 A1 | 3/1998 |
| WO | WO 98/36556 A1 | 8/1998 |
| WO | WO 98/49631 A2 | 11/1998 |
| WO | WO 99/19811 A3 | 4/1999 |

OTHER PUBLICATIONS

Part 3 of Appendix to Defendants Samsung Electronics Co., Ltd. and Samsung Telecommunications America, LLC'S Post-Trial Brief Regarding Unenforceability of the '482 Patent Due to Inequitable Conduct, May 20, 2013.

Part 4 of Appendix to Defendants Samsung Electronics Co., Ltd. and Samsung Telecommunications America, LLC'S Post-Trial Brief Regarding Unenforceability of the '482 Patent Due to Inequitable Conduct, May 20, 2013.

Part 5 of Appendix to Defendants Samsung Electronics Co., Ltd. and Samsung Telecommunications America, LLC'S Post-Trial Brief Regarding Unenforceability of the '482 Patent Due to Inequitable Conduct, May 20, 2013.

Defendants Samsung Electronics Co., Ltd. and Samsung Telecommunications America, LLC'S Renewed Motion for Judgment as a Matter of Law No. 3: Invalidity, May 20, 2013.

Defendants Samsung Electronics Co., Ltd. and Samsung Telecommunications America, LLC'S Brief in Support of Their Renewed Motion for Judgment as a Matter of Law No. 3: Invalidity, May 20, 2013.

Appendix to Defendants Samsung Electronics Co., Ltd. and Samsung Telecommunications America, LLC'S Brief in Support of Their Renewed Motion for Judgment as a Matter of Law No. 3: Invalidity, May 20, 2013.

Part 2 of Appendix to Defendants Samsung Electronics Co., Ltd. and Samsung Telecommunications America, LLC'S Brief in Support of Their Renewed Motion for Judgment as a Matter of Law No. 3: Invalidity, May 20, 2013.

Defendants Samsung Electronics Co., Ltd. and Samsung Telecommunications America, LLC'S Reply Brief in Support of Their Motion to Strike Summit 6'S Trial Exhibit PX-1003, Civil Action No. 3:11-cv-367-O, Jun. 5, 2013.

Appendix to Defendants Samsung Electronics Co., Ltd. and Samsung Telecommunications America, LLC'S Reply Brief in Support of Their Motion to Strike Summit 6'S Trial Exhibit PX-1003, Civil Action No. 3:11-cv-367-O, Jun. 5, 2013.

Defendants Samsung Electronics Co., Ltd. and Samsung Telecommunications America, LLC'S Reply in Support of Their Renewed Motion for Judgment as a Matter of Law No. 3: Invalidity, Civil Action No. 3:11-cv-367-O, Jun. 17, 2013.

Defendants Samsung Electronics Co., Ltd. and Samsung Telecommunications America, LLC'S Reply Brief in Support of Their Renewed Motion for Judgment as a Matter of Law No. 3: Invalidity, Civil Action No. 3:11-cv-367-O, Jun. 17, 2013.

Appendix to Defendants Samsung Electronics Co., Ltd. and Samsung Telecommunications America, LLC'S Reply Brief in Support of Their Renewed Motion for Judgment as a Matter of Law No. 3: Invalidity, Civil Action No. 3:11-cv-367-O, Jun. 17, 2013.

Defendants Samsung Electronics Co., Ltd. and Samsung Telecommunications America, LLC'S Reply Post-Trial Brief Regarding Unenforceability of the '482 Patent Due to Inequitable Conduct, Civil Action No. 3:11-cv-367-O, Jun. 17, 2013.

Appendix to Defendants Samsung Electronics Co., Ltd. and Samsung Telecommunications America, LLC'S Reply Post-Trial Brief Regarding Unenforceability of the '482 Patent Due to Inequitable Conduct, Civil Action No. 3:11-cv-367-O, Jun. 17, 2013.

(56) References Cited

OTHER PUBLICATIONS

Memorandum Opinion and Order, Civil Action No. 3:11-cv-367-O, Jun. 26, 2013.
Final Judgment, Civil Action No. 3:11-cv-367-O, Jun. 26, 2013.
Report on the Filing or Determination of an Action Regarding a Patent or Trademark, Civil Action No. 3:11-cv-367-O, Jun. 27, 2013.
*Summit 6 LLC* v. *Research in Motion Corp.*, Civil Action No. 3:11-cv-367-O, Bench Trial Transcript vol. 1, May 6, 2013.
*Summit 6 LLC* v. *Research in Motion Corp.*, Civil Action No. 3:11-cv-367-O, Bench Trial Transcript vol. 2, May 8, 2013.
*Summit 6 LLC* v. *Research in Motion Corp.*, Civil Action No. 3:11-cv-367-O, Bench Trial Transcript vol. 3, May 13, 2013.
Transcript of Trial, vol. 1, 3:11-cv-00367-o, Dallas, TX, Mar. 29, 2013.
Transcript of Trial, vol. 2, 3:11-cv-00367-o, Dallas, TX, Mar. 29, 2013.
Transcript of Trial, vol. 1, 3:11-cv-00367-o, Dallas, TX, Apr. 1, 2013.
Transcript of Trial, vol. 2, 3:11-cv-00367-o, Dallas, TX, Apr. 1, 2013.
Transcript of Trial, vol. 3, 3:11-cv-00367-o, Dallas, TX, Apr. 1, 2013.
Transcript of Trial, vol. 1, 3:11-cv-00367-o, Dallas, TX, Apr. 2, 2013.
Transcript of Trial, vol. 2, 3:11-cv-00367-o, Dallas, TX, Apr. 2, 2013.
Transcript of Trial, vol. 4A, 3:11-cv-00367-o, Dallas, TX, Apr. 3, 2013.
Transcript of Trial, vol. 2, 3:11-cv-00367-o, Dallas, TX, Apr. 3, 2013.
Transcript of Trial, vol. 1, 3:11-cv-00367-o, Dallas, TX, Apr. 4, 2013.
Transcript of Trial, vol. 1, 3:11-cv-00367-o, Dallas, TX, Apr. 5, 2013.
Emily Cohen, "Set Your Sites High," PC Magazine, May 26, 1998.
Plante et al., "The NCSA Astronomy Digital Image Library: From Data Archiving to Data Publishing," Sep. 21, 1998.
Augot et al., "Secure Delivery of Images over Open Networks," Proceedings of the IEEE, vol. 87, Issue 7, pp. 1251-1266, Jul. 1999.
Persits, Peter, "Browser-Based File Uploading Under the Microscope," 15 Seconds, Nov. 21, 1998.
Dean, Doug, "Down and Dirty Browser Uploading with a VB ASP Component," Mar. 11, 1999.
Horstmann et al., "Distributed Authoring on the Web with the BSCW Shared Workspace System," StandardView, vol. 5, No. 1, Mar. 1997.
Netscape Communications Corporation, "Creating Web Pages," Apr. 27, 1999.
Steinberg, Jill, "New Start-Up Releases Java Application and Enabling Software," JavaWorld, Oct. 1, 1996.
Bilson, Rob, "Net-It Central 1.0," IDM, Jul. 31, 1997.
Warp 10 Technologies Inc., Jul. 10, 1998.
Pictra Incorporated, Nov. 11, 1998.
Letter from Terry Anderson to Craig Hamway, Oct. 16, 1997.
PictureWorks ADP Demo, May 1, 1998.
Letter from Terry Anderson to Ken Karutz, May 1, 1998.
Email from Scott Lewis to Lisa Wood, Jul. 2, 1998.
Email from Robin Fried to Scott Lewis et al., Jul. 5, 1998.
Email from Scott Lewis to Robin Fried, Jul. 8, 1998.
Email from Robin Fried to Martha White, Jul. 9, 1998.
Email from Robin Fried to Scott Lewis et al., Jul. 9, 1998.
Email from Don Strickland to Lisa Wood et al., Jul. 14, 1998.
Emails from Scott Lewis to Lisa Wood et al., Jul. 17-18, 1998.
PictureWorks Technology, Inc. Board Update, Jun. 20, 1998.
Letter from Terry Anderson, Jul. 22, 1998.
Email from Don Strickland to Lisa Wood et al., Jul. 22, 1998.
Emails from Don Strickland, Jul. 27 and Aug. 7, 1998.
Email from Robin Fried to Scott Lewis et al., Jul. 28, 1998.
Email from Scott Lewis to Lisa Wood et al., Jul. 29, 1998.
Prioritized Activities for Enterprise Team, Jul. 31, 1998.
Email from Don Strickland to Craig Hamway, Aug. 2, 1998.
Board Update from Don Strickland, Aug. 7, 1998.
Email from Lisa Wood, Aug. 10, 1998.
Email from Scott Lewis to Terry Anderson, Aug. 13, 1998.
Letter from Terry Anderson to Randy Kau, Aug. 14, 1998.
Email from Kirby Lunger to Don Strickland et al., Aug. 14, 1998.
Email from Kirby Lunger to Lisa Wood, Aug. 26, 1998.
Email from Terry Anderson to Don Strickland, Aug. 25, 1998.
Email from Kirby Lunger to Lisa Wood, Aug. 31, 1998.
Email from Robin Fried to Scott Lewis et al., Sep. 1, 1998.
Email from Scott Lewis to Lisa Wood et al., Sep. 1, 1998.
Email from Don Strickland to Terry Anderson et al., Sep. 8, 1998.
Email from Scott Lewis to Jeff Paradise, Sep. 11, 1998.
Letter from Terry Anderson to Howard Latham, Sep. 15, 1998.
Email from Scott Lewis to Jim McCarthy, Sep. 17, 1998.
Email from Terry Anderson to Don Strickland et al., Sep. 18, 1998.
Email from Scott Lewis to Lisa Wood et al., Sep. 22, 1998.
Letter from Anthony Delli Colli to Wayne Mangold, Sep. 18, 1998.
Email from Scott Lewis to Lisa Wood et al., Sep. 23, 1998.
Email from Robin Fried to Stu Roberson, Sep. 21, 1998.
Letter from Terry Anderson to Sei-Wai Lee, Sep. 24, 1998.
Email from Scott Lewis to Lisa Wood, Sep. 25, 1998.
Email from Terry Anderson to Lisa Wood et al., Sep. 29, 1998.
Letter from Scott Lewis to Karim El-Fishaway, Oct. 2, 1998.
Email from Anthony Delli Colli to Stu Roberson et al., Oct. 2, 1998.
PictureWorks presentation to eBay, Oct. 16, 1998.
Letter from Scott Lewis to Gary Dillabough, Oct. 20, 1998.
Email from Don Strickland to PWT Employees, Oct. 31, 1998.
Press Release, Moore Data Management Services and PictureWorks Technology Inc., Announce Partnership to Revolutionize Use of Real Estate Photos on the Internet, Nov. 6, 1998.
Press Release, PictureWorks Technology Inc., Streamlines Posting of Photos to the Internet, Nov. 6, 1998.
Email from Laurie Fleming to Andrew Hunter et al., Nov. 13, 1998.
Letter from Scott Lewis to Wayne Graves, Nov. 16, 1998.
Email from Scott Lewis to Terry Anderson et al., Nov. 20, 1998.
Screenshots from Prepare and Post Video, Nov. 20, 1998.
Laura Roe, "New Software Gives Real Estate a View of the Future," National Real Estate Investor, Dec. 1, 1998.
PictureWorks Information, Dec. 9, 1998.
PictureWorks Prepare & Post, Fourth Quarter, 1998.
Prepare & Post Product Overview, Fourth Quarter, 1998.
Letter from Terry Anderson to Neil Shafran, Jan. 12, 1999.
Letter from Stu Roberson to James Rowley, Jan. 29, 1999.
Product Picks, Realtor Magazine, Feb. 1, 1999.
PictureWorks Kodak Presentation, Feb. 24, 1999.
Letter from Don Strickland to Phil Ashe, Mar. 2, 1999.
PictureWorks ADP Presentation, Mar. 11, 1999.
PictureWorks Press Release, "PictureWorks Releases New Free Digital Imaging Software; MediaCenter Offers Essential Tools for Web Imaging," Mar. 31, 1999.
PictureWorks Press Release, "PictureBay.com to Give-Away 30 Digital Cameras in 30 Days," Apr. 12, 1999.
PictureWorks Press Release, "PictureWorks Technology's PictureBay Solves #1 Frustration of eBay Members, Adding Pictures to Auctions," Apr. 12, 1999.
PictureWorks Press Release, "PictureWorks Technology's Rimfire Empowers any Website to Easily Accept, Process, and Display Visitor Photos and Media," Apr. 12, 1999.
Rimfire real-time integrated media brochure, Apr. 12, 1999.
Letter from Terry Anderson to Jonathan Graff, Apr. 26, 1999.
Sales Update, Apr. 30, 1999.
"PictureWorks Plans to Become Powerhouse in Internet Imaging—Exclusive Interview with CEO," The Future Image Report, Vol, 7, Issue 1, May 1, 1999.
Email from Laurie Fleming to Terry Anderson et al., May 7, 1999.
Roland Woerner et al., "eBay for Dummies," Chapter 12, May 10, 1999.
Letter from Scott Lewis to Roland Woerner, May 10, 1999.
Letter from Stu Roberson to Jim Ferras, May 25, 1999.
Rimfire real-time integrated media, May 27, 1999.
Letter from Scott Lewis to Candace Gates, May 28, 1999.

(56) References Cited

OTHER PUBLICATIONS

Letter of Intent between PictureWorks Technology, Inc. and Auction Universe, May 31, 1999.
Letter from Scott Lewis to Matthew Lengfelder, Jun. 1, 1999.
"Casio and PictureWorks Announce Co-Branding and Distribution Agreement; MediaCenter Offers Essential Tools for Web Imaging," Jun. 3, 1999.
Sales Update, Jun. 4, 1999.
Email from Laurie Fleming to Terry Anderson et al., Jun. 7, 1999.
PictureWorks pricing for prototype, Jun. 9, 1999.
PictureWorks proposal, Jun. 9, 1999.
PictureWorks scope of work, Jun. 9, 1999.
Letter from Terry Anderson to Amazon, Jun. 9, 1999.
"PictureWorks Announces Co-Branding and Distribution Agreements with On-Line Photo Services Companies," Jun. 14, 1999.
PictureWorks Polaroid presentation, Jun. 15, 1999.
PictureWorks Letter of Intent, Jun. 23, 1999.
Email from Lisa Wood to Don Strickland et al., Jun. 30, 1999.
East Bay Business Times, "PictureWorks Founder Keeps True to Original Vision," Jul. 2, 1999.
PictureWorks Technology Proposal, Jul. 9, 1999.
Press Release, "PictureWorks Releases New, Free Imaging Weblication; MediaCenter 1.1 Offers Essential Photo Tools for Internet Imaging and Web Publishing, Ideal for Digital Camera Users," Jul. 19, 1999.
Email from Arlette Heule to Lisa wood et al., Jul. 22, 1999.
Email from Don Strickland to Terry Anderson et al., Jul. 23, 1999.
Email from Lisa Wood to Marty Frame et al., Jul. 23, 1999.
Email from Matt Chang to Lisa Wood et al., Jul. 28, 1999.
PictureWorks Statement of Work, Jul. 29, 1999.
Email from Laurie Fleming to Curt Hibbs et al., Jul. 29, 1999.
PictureWorks Sales Update, Aug. 2, 1999.
Press Release, "Picturebay is the Fastest and Easiest Way to Add Pictures to Auctions," Aug. 3, 1999.
Email from Scott Lewis to Lisa Wood et al., Aug. 5, 1999.
Email from Don Strickland to Terry Anderson et al., Aug. 6, 1999.
Email from Kristy Holch to Lisa Wood et al., Aug. 8, 1999.
Email from Don Strickland to Lisa Wood et al., Aug. 9, 1999.
MakeoverStudio.com screenshots, Aug. 9, 1999.
PictureWorks Service Agreement, Aug. 9, 1999.
PictureWorks Preferred Partner Agreement, Aug. 9, 1999.
Email from Lori Von Rueden to Lisa Wood, Aug. 10, 1999.
Email from Laurie Fleming to Robin et al. Aug. 12, 1999.
Email from Matt Chang to Lisa Wood et al., Aug. 13, 1999.
Email from Laurie Fleming to Terry Anderson et al., Aug. 16, 1999.
Email from Don Strickland to Terry Anderson et al., Aug. 16, 1999.
Email from Laurie Fleming to Curt Hibbs et al., Aug. 16, 1999.
Email from Robin Fried to Chris Weiss et al., Aug. 17, 1999.
Letter from Lori Von Rueden to Don Strickland, Aug. 18, 1999.
Email from Laurie Fleming to Curt Hibbs et al., Aug. 27, 1999.
PictureWorks letter to AOL, Aug. 23, 1999.
Email from Anthony Delli Colli to Stu Roberson et al., Aug. 23, 1999.
Email from Robin Fried to Lisa Wood et al., Aug. 23, 1999.
Email from Anthony Delli Colli to Terry Anderson et al., Aug. 24, 1999.
Email from Robin Fried to Chris Weiss et al., Aug. 24, 1999.
Email from Phil Ashe to Lisa Wood et al., Aug. 24, 1999.
PictureWorks Integration Checklist Aug. 27, 1999.
Press Release, "Realtor.com and PictureWorks Technology, Inc. Up the Ante on Real Estate Content," Aug. 30, 1999.
Email from Laurie Fleming to Mike Jaffe et al., Aug. 31, 1999.
Email from David Allen to Jon Barry et al., Sep. 2, 1999.
Email from Laurie Fleming to Terry Anderson et al., Sep. 2, 1999.
Rimfire 2.0 Submission API User Guide and Reference, Sep. 5, 1999.
Rimfire 2.0 Submission API (RSAPI) Step-by-Step Guide, Sep. 5, 1999.
MakeoverStudio Network Imaging Project Outline, Sep. 7, 1999.
Email from Scott Lewis to Lisa Wood et al., Sep. 7, 1999.
Realtor.com and PictureWorks, Sep. 7, 1999.
Functional System Summary for Rimfire 10.0 GM6, Sep. 7, 1999.
Email from Matt Chang to Lisa Wood et al., Sep. 8, 1999.
MakeoverStudio Architecture, Sep. 8, 1999.
Email from Robin Fried to Laurie Fleming et al., Sep. 8, 1999.
Email from Laurie Fleming to Curt Hibbs et al., Sep. 9, 1999.
Email from Chrissie Kremer to Lisa Wood et al., Sep. 12, 1999.
PictureWorks Rimfire Instant Photo Submission, Sep. 14, 1999.
Email from Laurie Von Rueden to Bob Puette et al., Sep. 15, 1999.
Email from Sarah Pate, Sep. 15, 1999.
Email from Don Strickland to Terry Anderson et al., Sep. 16, 1999.
Email from Lee Cannon to Don Strickland et al., Sep. 17, 1999.
Email from Anthony Delli Colli to Lisa Wood et al., Sep. 20, 1999.
Email from Lori Von Rueden to Lisa Wood et al., Sep. 21, 1999.
Email from Lori Von Rueden to Chrissie Kremer et al., Sep. 21, 1999.
Email from David Schappell to Terry Anderson, Sep. 22, 1999.
Functional System Summary for Rimfire 2.01, Sep. 23, 1999.
Functional System Summary for Rimfire 2.0, Sep. 23, 1999.
Email from Don Strickland to Terry Anderson et al., Sep. 24, 1999.
Email from Matt Chang to Lisa Wood, Sep. 24, 1999.
Email from Lori Von Rueden to Lisa Wood et al., Sep. 27, 1999.
Email from Laurie Fleming to Curt Hibbs et al., Sep. 27, 1999.
Email from Matt Chang to Lisa Wood, Sep. 27, 1999.
Email from Laurie Fleming to Lisa Wood et al., Sep. 28, 1999.
Email from Don Strickland to Lisa Wood, Sep. 28, 1999.
Email from Lori Von Rueden to Lisa Wood et al., Sep. 29, 1999.
Email from Lisa Wood to Don Strickland et al., Sep. 29, 1999.
Phatmouth Project, Sep. 30, 1999.
Email from Brad Brighton to Terry Anderson et al., Sep. 30, 1999.
Rimfire FAQ, Oct. 1, 1999.
Email from Don Strickland to Robert Dominy et al., Oct. 3, 1999.
Email from Don Strickland to Devin Granback et al., Oct. 5, 1999.
Email from Lori Von Rueden to Don Strickland et al., Oct. 5, 1999.
Letter from Lori Von Rueden to Paul Woods, Oct. 6, 1999.
Email from Norman Winarsky to Robert Dominy, Oct. 6, 1999.
Email from Don Strickland to Terry Anderson et al., Oct. 8, 1999.
Rimfire Integration, Oct. 18, 1999.
Rimfire Mirror Service, Oct. 8, 1999.
Rimfire 2.0 Presentation Output Reference Snipetts, Oct. 8, 1999.
Rimfire 2.0 Presentation Output Reference, Oct. 8, 1999.
PictureWorks Ebay Presentation, Oct. 8, 1999.
Email from Laurie Fleming to Mike Ryder et al., Oct. 8, 1999.
Email from Laurie Fleming to Marty Frame et al., Oct. 11, 1999.
Email from Laurie Fleming to Lisa Wood, Oct. 12, 1999.
Email from Laurie Fleming to Curt Hibbs et al., Oct. 13, 1999.
Picturebay Screenshot, Oct. 13, 1999.
MakeoverStudio.com screen shot, Oct. 16, 1999.
PictureWorks Technology, Inc. Propels Leadership Position in Internet Imaging with Rimfire 2.5, Oct. 16, 1999.
Email from Scott Lewis to Terry Anderson et al., Oct. 18, 1999.
PictureWorks Rimfire Instant Photo Submission White Paper, Oct. 18, 1999.
Email from Stu Robertson to Don Strickland et al., Oct. 19, 1999.
Email from Laurie Fleming to Sarah Pate et al., Oct. 21, 1999.
Email from Sarah Pate to Lisa Wood et al., Oct. 26, 1999.
Email from Chris Weiss to Lisa Wood, Oct. 27, 1999.
Email from Anthony Delli Colli to Stu Roberson et al., Oct. 27, 1999.
Email from Lee Cannon to Janice Jones et al., Oct. 28, 1999.
Polaroid's Technical Topic/Question List, Oct. 29, 1999.
Email from Don Strickland to Terry Anderson et al., Oct. 29, 1999.
Email from Don Strickland to Terry Anderson et al., Nov. 2, 1999.
Auction Universe Statement of Work, Nov. 3, 1999.
Polaroid Statement of Work, Nov. 3, 1999.
Email from Anthony Delli Colli to Stu Roberson et al., Nov. 4, 1999.
Email from Sarah Pate to Joe Byrd, Nov. 4, 1999.
Email from Sarah Pate to Brad Schafer et al., Nov. 5, 1999.
Email from Terry Anderson to Bill Phelan, Nov. 5, 1999.
PictureWorks Technology, Inc. Expands in Real Estate Market with Adoption of Rimfire on Realtor.com, Nov. 8, 1999.
PictureWorks Technology, Inc.'s Rimfire Makes PictureBay the Leading Provider of Auction Photo Services, Nov. 9, 1999.

(56) References Cited

OTHER PUBLICATIONS

Makeover NetWorks and Avon, Nov. 10, 1999.
PictureWorks Technology Inc. Builds Backbone for Internet Imaging, Significant Partners Integrate Rimfire, Nov. 10, 1999.
PictureWorks Technology, Inc. Shows Strong Revenue Growth in Internet Imaging Business, Nov. 10, 1999.
Email from Steve Saylor to Donald Strickland et al., Nov. 11, 1999.
PictureWorks Technology, Inc. Announces Equity Investment in Phatmouth.com, Nov. 11, 1999.
PictureWorks Technology, Inc. Provides Internet Imaging to Real Estate Village, Nov. 12, 1999.
Email from Laurie Fleming to Lisa Wood et al., Nov. 15, 1999.
Pictureworks Technology, Inc. Propels Leadership Position in Internet Imaging with Rimfire 2.5, Nov. 16, 1999.
Email from John Stevens to Terry Anderson et al., Nov. 17, 1999.
Email from Laurie Fleming to Lisa Wood, Nov. 17, 1999.
PictureWorks Technology, Inc. Leaps off the Desktop as a Six Year Old Internet Startup, Nov. 17, 1999.
Email from Don Strickland to Don Strickland et al., Nov. 18, 1999.
Rimfire Mirror Service, Nov. 19, 1999.
Rimfire 2.0 Submission API User Guide and Reference, Nov. 19, 1999.
Rimfire 2.0 Submission API (RSAPI) Step-by-Step Guide, Nov. 19, 1999.
Rimfire 2.6 Integration Checklist, Nov. 19, 1999.
Email from Lee Cannon to Don Strickland et al., Nov. 22, 1999.
PictureWorks Technology Files for Patent on Internet Media Submission Invention, Nov. 22, 1999.
PictureWorks eBay Technology Overview, Fourth Quarter, 1999.
Fred Delobaerde, "Development of Multimedia Courseware Technology for Use in Hydrology and Water Management Instruction," Thesis, Department of Agricultural and Biosystems Engineering, McGill University, Aug. 1998.
McDonald, Glenn, "Pictra Puts Your Photo Album on the Web for Free," PC World, Jun. 13, 1997.
Pictra Incorporated website, Oct. 9, 1997.
"Pictra first to make publishing and sharing photo albums over Internet a snap for PC users; award-winning software offers easy, fun way to create digital photo albums to share over Internet," Business Wire, May 12, 1997. (Missing pp. 3-4).
Blatner, David, "The Automatic Publisher," Macworld, May 1999.
Weger, Chuck, "Stick to the Script," American Printer, Dec. 1995.
Lowe et al., "WebReport: A World Wide Web Based Clinical Multimedia Reporting System," 1996.
Lowe et al., "The Image Engine™ HPCC Project. A Medical Digital Library System using Agent-Based Technology to Create an Integrated View of the Electronic Medical Record," Proceedings of ADL, 1996.
Adding Images to the Engine Database, Jun. 25, 1997.
Image Engine Client, Jun. 25, 1997.
Bodoh, Dan, "Making the Most of the Internet for Failure Analysis," Proceedings from the 24th International Symposium for Testing and Failure Analysis, Nov. 15-19, 1998.
Martiner, William, "Visual Basic Programmer's Guide to Web Development," Chapters 1 and 12, John Wiley & Sons, 1997.
Degenhart, Curt, "AOL in a Nutshell: A Desktop Guide to America Online," O'Reilly Media, Jul. 8, 1998.
Popa, Sorin, "WarpRes™ Technology—White Paper," Jan. 14, 1998.
Warp 10 Technologies, Inc., "Rubie's Costumes Warps into High Tech," Jan. 21, 1998.
Kervella et al., "MHEGAM—A Multimedia Messaging System," 1997.
Schurmann, Gerd, "Multimedia mail," Multimedia Systems, Springer Verlag, 1996.
Internet Assistant for PowerPoint, The PowerPoint 95 to World Wide Web Document Converter, Feb. 2, 1996.
Microsoft, Internet Assistant for PowerPoint, Nov. 20, 1996.
Bernard, Ryan, "The Corporate Intranet," 2nd Edition, 1996.
InfoAccess Home Page, Jan. 12, 1998.
InfoAccess, HTML Transit, Jan. 12, 1998.
Postel et al., "File Transfer Protocol," Oct. 1985.
Garner et al., "The application of telepresence in medicine," BT Technology Journal, vol. 15, No. 4, Oct. 1997.
M. Sirbu, "A Content-Type Header Field for Internet Messages," Mar. 1988.
Borenstein et al., "MIME (Multipurpose Internet Mail Extensions): Mechanisms for Specifying and Describing the Format of Internet Message Bodies," Jun. 1992.
N. S. Borenstein, "MIME and Metamail: Making Multimedia Mail More Mainstream," USENIX Conference, Jan. 29, 1993.
Novell, GroupWise, Version 4.1.
Open Mobile Alliance, "Multimedia Messaging Service—Encapsulation Protocol," Version 1.1, Oct. 2002.
ETSI, "Digital Cellular telecommunications system (Phase 2+); Technical realization of the Short Message Service (SMS) Point-to-Point (PP)," GSM 03.40, Version 5.3.0, Jul. 1996.
3rd Generation Partnership Project; Technical Specification Group Terminals; Multimedia Messaging Service (MMS); Functional description; Stage 2, 3G TS 23.140 vesion 0.1.0, Oct. 1999.
CCITT, Information Technology—Digital Compression and Coding of Continuous-Tone Still Images—Requirements and Guidelines, Recommendation T.81, Sep. 1992.
Knowledge Base, "In Unix, what is metamail and how do I use it?," Dec. 2, 2009.
T. Negrino, "Dueling HTML editors," Macworld, Dec. 1996.
*Summit 6 LLC*, v. *Research in Motion Corporation, et al.*, Civil Action No. 3:11-CV-00367-0, Defendants' Invalidity Contentions, Sep. 9, 2011.
*Summit 6 LLC*, v. *Research in Motion Corporation, et al.*, Civil Action No. 3:11-CV-00367-0, Exhibit A1 of Defendants' Invalidity Contentions, Sep. 9, 2011.
*Summit 6 LLC*, v. *Research in Motion Corporation, et al.*, Civil Action No. 3:11-CV-00367-0, Exhibit A2 of Defendants' Invalidity Contentions, Sep. 9, 2011.
*Summit 6 LLC*, v. *Research in Motion Corporation, et al.*, Civil Action No. 3:11-CV-00367-0, Exhibit A3 of Defendants' Invalidity Contentions, Sep. 9, 2011.
*Summit 6 LLC*, v. *Research in Motion Corporation, et al.*, Civil Action No. 3:11-CV-00367-0, Exhibit A4 of Defendants' Invalidity Contentions, Sep. 9, 2011.
*Summit 6 LLC*, v. *Research in Motion Corporation, et al.*, Civil Action No. 3:11-CV-00367-0, Exhibit A5 of Defendants' Invalidity Contentions, Sep. 9, 2011.
*Summit 6 LLC*, v. *Research in Motion Corporation, et al.*, Civil Action No. 3:11-CV-00367-0, Exhibit A6 of Defendants' Invalidity Contentions, Sep. 9, 2011.
*Summit 6 LLC*, v. *Research in Motion Corporation, et al.*, Civil Action No. 3:11-CV-00367-0, Exhibit A7 of Defendants' Invalidity Contentions, Sep. 9, 2011.
*Summit 6 LLC*, v. *Research in Motion Corporation, et al.*, Civil Action No. 3:11-CV-00367-0, Exhibit A8 of Defendants' Invalidity Contentions, Sep. 9, 2011.
*Summit 6 LLC*, v. *Research in Motion Corporation, et al.*, Civil Action No. 3:11-CV-00367-0, Exhibit A9 of Defendants' Invalidity Contentions, Sep. 9, 2011.
*Summit 6 LLC*, v. *Research in Motion Corporation, et al.*, Civil Action No. 3:11-CV-00367-0, Exhibit A10 of Defendants' Invalidity Contentions, Sep. 9, 2011.
*Summit 6 LLC*, v. *Research in Motion Corporation, et al.*, Civil Action No. 3:11-CV-00367-0, Exhibit A11 of Defendants' Invalidity Contentions, Sep. 9, 2011.
*Summit 6 LLC*, v. *Research in Motion Corporation, et al.*, Civil Action No. 3:11-CV-00367-0, Exhibit A12 of Defendants' Invalidity Contentions, Sep. 9, 2011.
*Summit 6 LLC*, v. *Research in Motion Corporation, et al.*, Civil Action No. 3:11-CV-00367-0, Exhibit A13 of Defendants' Invalidity Contentions, Sep. 9, 2011.
*Summit 6 LLC*, v. *Research in Motion Corporation, et al.*, Civil Action No. 3:11-CV-00367-0, Exhibit A14 of Defendants' Invalidity Contentions, Sep. 9, 2011.

(56) References Cited

OTHER PUBLICATIONS

*Summit 6 LLC*, v. *Research in Motion Corporation, et al.*, Civil Action No. 3:11-CV-00367-0, Exhibit B1 of Defendants' Invalidity Contentions, Sep. 9, 2011.
*Summit 6 LLC*, v. *Research in Motion Corporation, et al.*, Civil Action No. 3:11-CV-00367-0, Exhibit B2 of Defendants' Invalidity Contentions, Sep. 9, 2011.
*Summit 6 LLC*, v. *Research in Motion Corporation, et al.*, Civil Action No. 3:11-CV-00367-0, Exhibit B3 of Defendants' Invalidity Contentions, Sep. 9, 2011.
*Summit 6 LLC*, v. *Research in Motion Corporation, et al.*, Civil Action No. 3:11-CV-00367-0, Exhibit B4 of Defendants' Invalidity Contentions, Sep. 9, 2011.
*Summit 6 LLC*, v. *Research in Motion Corporation, et al.*, Civil Action No. 3:11-CV-00367-0, Exhibit B5 of Defendants' Invalidity Contentions, Sep. 9, 2011.
*Summit 6 LLC*, v. *Research in Motion Corporation, et al.*, Civil Action No. 3:11-CV-00367-0, Exhibit B6 of Defendants' Invalidity Contentions, Sep. 9, 2011.
*Summit 6 LLC*, v. *Research in Motion Corporation, et al.*, Civil Action No. 3:11-CV-00367-0, Exhibit B7 of Defendants' Invalidity Contentions, Sep. 9, 2011.
*Summit 6 LLC*, v. *Research in Motion Corporation, et al.*, Civil Action No. 3:11-CV-00367-0, Exhibit B8 of Defendants' Invalidity Contentions, Sep. 9, 2011.
*Summit 6 LLC*, v. *Research in Motion Corporation, et al.*, Civil Action No. 3:11-CV-00367-0, Exhibit B9 of Defendants' Invalidity Contentions, Sep. 9, 2011.
*Summit 6 LLC*, v. *Research in Motion Corporation, et al.*, Civil Action No. 3:11-CV-00367-0, Exhibit B10 of Defendants' Invalidity Contentions, Sep. 9, 2011.
*Summit 6 LLC*, v. *Research in Motion Corporation, et al.*, Civil Action No. 3:11-CV-00367-0, Exhibit B11 of Defendants' Invalidity Contentions, Sep. 9, 2011.
*Summit 6 LLC*, v. *Research in Motion Corporation, et al.*, Civil Action No. 3:11-CV-00367-0, Exhibit B12 of Defendants' Invalidity Contentions, Sep. 9, 2011.
*Summit 6 LLC*, v. *Research in Motion Corporation, et al.*, Civil Action No. 3:11-CV-00367-0, Exhibit B13 of Defendants' Invalidity Contentions, Sep. 9, 2011.
*Summit 6 LLC*, v. *Research in Motion Corporation, et al.*, Civil Action No. 3:11-CV-00367-0, Exhibit B14 of Defendants' Invalidity Contentions, Sep. 9, 2011.
*Summit 6 LLC*, v. *Research in Motion Corporation, et al.*, Civil Action No. 3:11-CV-00367-0, Exhibit B15 of Defendants' Invalidity Contentions, Sep. 9, 2011.
*Summit 6 LLC*, v. *Research in Motion Corporation, et al.*, Civil Action No. 3:11-CV-00367-0, Exhibit B16 of Defendants' Invalidity Contentions, Sep. 9, 2011.
*Summit 6 LLC*, v. *Research in Motion Corporation, et al.*, Civil Action No. 3:11-CV-00367-0, Exhibit B17 of Defendants' Invalidity Contentions, Sep. 9, 2011.
*Summit 6 LLC*, v. *Research in Motion Corporation, et al.*, Civil Action No. 3:11-CV-00367-0, Exhibit B18 of Defendants' Invalidity Contentions, Sep. 9, 2011.
*Summit 6 LLC*, v. *Research in Motion Corporation, et al.*, Civil Action No. 3:11-CV-00367-0, Exhibit B19 of Defendants' Invalidity Contentions, Sep. 9, 2011.
*Summit 6 LLC*, v. *Research in Motion Corporation, et al.*, Civil Action No. 3:11-CV-00367-0, Exhibit B20 of Defendants' Invalidity Contentions, Sep. 9, 2011.
*Summit 6 LLC*, v. *Research in Motion Corporation, et al.*, Civil Action No. 3:11-CV-00367-0, Exhibit B21 of Defendants' Invalidity Contentions, Sep. 9, 2011.
*Summit 6 LLC*, v. *Research in Motion Corporation, et al.*, Civil Action No. 3:11-CV-00367-0, Exhibit B22 of Defendants' Invalidity Contentions, Sep. 9, 2011.
*Summit 6 LLC*, v. *Research in Motion Corporation, et al.*, Civil Action No. 3:11-CV-00367-0, Exhibit B23 of Defendants' Invalidity Contentions, Sep. 9, 2011.
*Summit 6 LLC*, v. *Research in Motion Corporation, et al.*, Civil Action No. 3:11-CV-00367-0, Exhibit B24 of Defendants' Invalidity Contentions, Sep. 9, 2011.
*Summit 6 LLC*, v. *Research in Motion Corporation, et al.*, Civil Action No. 3:11-CV-00367-0, Exhibit B25 of Defendants' Invalidity Contentions, Sep. 9, 2011.
*Summit 6 LLC*, v. *Research in Motion Corporation, et al.*, Civil Action No. 3:11-CV-00367-0, Exhibit B26 of Defendants' Invalidity Contentions, Sep. 9, 2011.
*Summit 6 LLC*, v. *Research in Motion Corporation, et al.*, Civil Action No. 3:11-CV-00367-0, Exhibit B27 of Defendants' Invalidity Contentions, Sep. 9, 2011.
RIM's Supplemental Invalidity Contentions, Civil Action No. 3:11-CV-00367-O, May 4, 2012.
Publication List from Invalidity Contentions, May 14, 2012.
"An Interpersonal Multimedia Visualization System," Richard L. Phillips, Los Alamos National Laboratory, IEEE Computer Graphics and Applications, pp. 20-27 (May 1991).
"MediaView, A General Multimedia Digital Publication System," Richard L. Phillips, Communications of the ACM, pp. 75-83 (Jul. 1991, vol. 34, No. 7).
"MediaView: An Editable Multimedia Publishing System Developed with an Object-Oriented Toolkit," Richard L. Phillips, Los Alamos National Laboratory, Usenix (Summer 1991).
"Media Maker," Greg Burd, NeXTWORLD, p. 13 (Fall 1992, vol. 2, No. 3).
"TrueSpectra Announces the Availability of Photo>Graphics with Full ColorWave 2.0 Support," Business Wire, p. 7250080 (Jul. 25, 1996).
"Toronto-Based Graphics-Engine Developer to Expand Functionality of HP's Imaging for the Internet; TruesSpectra's ColorWave to Add Groundbreaking Capabilities to HP's Imaging for Internet," Business Wire, p. 9170271 (Sep. 17, 1997).
"Finally, Graphics Power for OS/2 Users," Kevin Linfield, Computing Canada, p. 28 (Oct. 14, 1997).
"Grubb & Ellis Uses TrueSpectra Image Server to Enhance Intranet Capabilities," Business Wire (Dec. 2, 1998).
"TrueSpectra Debuts Iris Image Server Solutions; New Technology Addresses Critical Visual Requirements for Making E-commerce the Dominant Selling Medium," Business Wire, p. 0161 (Apr. 14, 1999).
"TrueSpectra Announces Support for Sun's Java Advanced Imaging API; Imaging Solution for E-commerce Embraces Java Technology," Business Wire, p. 0246 (Jun. 15, 1999).
"PictureWorks Technology Inc. Aggressively Develops Imaging Intensive E-commerce Solutions Using IIP and FlashPix Technologies," Business Wire, p. 6250179, (Jun. 25, 1998).
"Internet: PictureWorks Builds Imaging for E-Commerce," Network Briefing (Jun. 29, 1998).
"Getting Started with RealPublisherTM Version 5.1," RealNetworks, Inc. (1998).
"Getting Started with RealPublisherTM Premiere Plug-in Version 5.0," RealNetworks, Inc. (1997).
"RealFlash and RealAudio Content Creation Guide Beta 5.0," RealNetworks, Inc. (1997).
http://web.archive.org/web/19980215082307/http://www8.real.com/publisher/hpindex.html#webpages "Add Audio and Video to Your Web Pages with RealPublisherTM," RealNetworks, Inc. (Feb. 15, 1998).
http://web.archive.org/web/19980215084737/http://www8.real.com/publisher/resources.html "RealPublisher Resources," RealNetworks, Inc. (Feb. 15, 1998).
http://web.archive.org/web/19980215093245/http://www8.real.com/publisher/quickstart.html "Quick Start Online Guide," RealNetworks, Inc. (Feb. 15, 1998).
http://web.archive.org/web/19980211180507/http://service.real.com/help/faq/rpub5faqa1.htm "RealPublisher 5.0 & 5.1 Frequently Asked Questions, Encoding Questions," RealNetworks, Inc. (Feb. 11, 1998).
http://web.archive.org/web/19980211180513/http://service.real.com/help/faq/rpub5faqa2.htm "RealPublisher 5.0 & 5.1 Frequently Asked Questions, Publishing Questions," RealNetworks, Inc. (Feb. 11, 1998).

(56) References Cited

OTHER PUBLICATIONS http://web.archive.org/web/19980211180520/http://service.real.com/help/faq/rpub5faqa3.htm "RealPublisher 5.0 & 5.1 Frequently Asked Questions, Special Topics Questions," RealNetworks, Inc. (Feb. 11, 1998).
http://web.archive.org/web/19980211180539/http://service.real.com/help/faq/rpub5faqa4.htm "RealPublisher 5.0 & 5.1 Frequently Asked Questions, RealPublisher 5.1 Specific Questions," RealNetworks, Inc. (Feb. 11, 1998).
"Pictra first to make publishing and sharing photo albums over the Internet a snap for PC uses; award-winning software offers easy, fun way to create digital photo albums to share over Internet," Business Wire (May 12, 1997).
"Pictra Puts Your Photo Album on the Web for Free," Glenn McDonald, PCWorld (Jun. 13, 1997).
"Put Your Photo Album on the Web," Glenn McDonald, PCWorld, p. 128 (Sep. 1997).
"Software and CD-ROM Reviews on File," p. 537 (Sep. 1997, vol. 13, Issue 9).
Stan Miastkowski, "WinFax Pro takes the pain out of sharing fax/modems," Infoworld, Oct. 11, 1993.
Announcing WinFax Pro, Version 2.0, Aug. 26, 1991.
Claim Construction Order, Civil Action No. 3:11-cv-367-O, May 21, 2012.
RealAudio and RealVideo Content Creation Guide Version 5.0, RealNetworks, Inc.
Inside MAPI, Irving De la Cruz and Les Thaler, Microsoft Press (1996).
RealPublisher, Getting Started with RealPublisher, Part 1, Version 5.1, RealNetworks, Inc.
Mobile Data Report, New Software Allows Most Windows Files to be Sent with MASC Mobidem Via Ram, vol. 6, No. 20, Oct. 10, 1994.
Info Access, Inc., HTML Transit—HTML Conversion Tool, Jan. 12, 1998.
Nebel et al., Form-Based File Upload in HTML, Nov. 1995.
Nebel, Ernesto, File Upload in HTML Forms, Sep. 23, 1994.
Point2 Internet Systems, Inc., Point2 Equipment Exchange, Making the World a Smaller Place.
HTML 4.0 Specification, Dec. 18, 1997.
Point2 Internet Systems, Inc. website screen shots, 1996-2000.
PictureWorks Technology, Inc. website screen shots, 1996-1998.
Ethan Wilde, "AppleScript for the Internet," Chapters 6, 9 and 16, Peachpit Press, 1998.
Pruett et al., "Visual Basic Controls Desk Reference CD," Waite Group Press, 1995.
Peal, David, "America Online Official Internet Guide," Second Edition, Osborne/McGraw-Hill, 1998.
Godin, Seth, "You've Got Pictures! AOL's Guide to Digital Imaging," AOL Press, 1998.
Lu et al., "e*World—The Official Guide for Macintosh Users," Hayden Books, 1994.
Tyler et al., "Microsoft FrontPage 98," Sams.net Publishing, 1997.
Lehto et al., "Official Microsoft FrontPage 98 Book," Microsoft Press, 1997.
Barbara Kasser, "Using Microsoft PowerPoint 97," Que Corporation, 1997.
Nokia 9000i Communicator Users Manual, 1998.
Smart Messaging Specification, Revision 1.0.0, Nokia Mobile Phones, Ltd., Sep. 15, 1997.
Microsoft Outlook 98 Step by Step, Microsoft Press, 1998.
Timothy Webster, "The Smart Way to Build Web Sites—NetObjects Fusion Handbook," Hayden Books, 1996.
Defendants Samsung Electronics Co., Ltd. and Samsung Telecommunications America, LLC'S Motion to Strike Plaintiff's Trial Exhibit PX-1003, May 9, 2013.
Order Granting Defendants Samsung Electronics Co., Ltd. and Samsung Telecommunications America, LLC'S Motion to Strike Plaintiff's Trial Exhibit PX-1003, May 9, 2013.
Defendants Samsung Electronics Co., Ltd. and Samsung Telecommunications America, LLC'S Brief in Support of Their Motion to Strike Plaintiff's Trial Exhibit PX-1003, May 9, 2013.
Defendants Samsung Electronics Co., Ltd. and Samsung Telecommunications America, LLC'S Post-Trial Brief Regarding Unenforceability of the '482 Patent Due to Inequitable Conduct, May 20, 2013.
Appendix to Defendants Samsung Electronics Co., Ltd. and Samsung Telecommunications America, LLC'S Post-Trial Brief Regarding Unenforceability of the '482 Patent Due to Inequitable Conduct, May 20, 2013.
*Summit 6, LLC v. Samsung Electronics Co., Ltd., and Samsung Telecommunications America, LLC*, Non-Confidential Brief of Plaintiff-Cross Appellant Summit 6, LLC., Summit 6, LLC, Feb. 24, 2014.
*Summit 6, LLC v. Samsung Electronics Co., Ltd., and Samsung Telecommunications America, LLC*, Non-Confidential Opening Brief of Defendants-Appellants Samsung Electronics Co., Ltd., and Samsung Telecommunications America, LLC, Dec. 13, 2013.
Request for Ex Parte Reexamination for U.S. Pat. No. 7,765,482, Sep. 10, 2013.
Zedler et al., "I-Media: An Integrated Media Server and Media Database as a Basic Component of a Cross Media Publishing System," Comput. & Graphics, vol. 21, No. 6, pp. 693-702, 1997.
E. Kim, "CGI Programming Unleashed," 1996.
Brophy et al., "Teach Yourself VBScript in 21 Days," 1996.
L. Pena, "SlitImage class," Aug. 25, 1997.
L. Pena, "FileSplit," Oct. 12, 1997.
"Microsoft Announces ActiveX Technologies," Microsoft News Center, Mar. 12, 1996.
"Using ActiveX Controls in Visual InterDev Web Applications," Microsoft Corporation, Aug. 1998.
M. Morrison, "Java Unleashed: Everything You Need to Know to Master Java!", 1996.
Y. Sauvageau, "Java Tip 57: Applet parameterization via class reflection," Aug. 1, 1998.
"The New IEEE Standard Dictionary of Electrical and Electronics Terms," Fifth Edition, 1993.
S. Yegulap, "Subdivide and Conquer," Winmag.com, Oct. 17, 1997.
D. McNett, "Secure Encryption Challenged by Internet-Linked Computers," Oct. 22, 1997.
"ET, Phone SETI@Home!", NASA Science, May 23, 1999.
Swank et al., Visual Basic 5, Web Database Developer's Guide, 1997.
M. Richards, "Oracle Unleashed," 1996.
AspUpload, 1999.
AspUpload 1.4, User Manual, 1998.
Advisory Action in Ex Parte Reexamination for U.S. Pat. No. 7,765,482, Aug. 13, 2014.
*Summit 6, LLC v. Samsung Electronics Co., Ltd., and Samsung Telecommunications America, LLC*, Non-Confidential Response and Reply Brief of Defendants-Appellants Samsung Electronics Co., Ltd., and Samsung Telecommunications America, LLC, No. 2013-1648, -1651, U.S. Court of Appeals for the Federal Circuit, Dec. 13, 2013.
Defendants Preliminary Invalidity Contentions, Exhibit A2, Civil Action No. 7:14-cv-00014, Aug. 11, 2014.
Defendants Preliminary Invalidity Contentions, Exhibit A4, Civil Action No. 7:14-cv-00014, Aug. 11, 2014.
Defendants Preliminary Invalidity Contentions, Exhibit A8, Civil Action No. 7:14-cv-00014, Aug. 11, 2014.
Defendants Preliminary Invalidity Contentions, Exhibit B1, Civil Action No. 7:14-cv-00014, Aug. 11, 2014.
Defendants Preliminary Invalidity Contentions, Exhibit B2, Civil Action No. 7:14-cv-00014, Aug. 11, 2014.
Defendants Preliminary Invalidity Contentions, Exhibit B12, Civil Action No. 7:14-cv-00014, Aug. 11, 2014.
Defendants Preliminary Invalidity Contentions, Exhibit B18, Civil Action No. 7:14-cv-00014, Aug. 11, 2014.
Defendants Preliminary Invalidity Contentions, Exhibit B20, Civil Action No. 7:14-cv-00014, Aug. 11, 2014.
Defendants Preliminary Invalidity Contentions, Exhibit B26, Civil Action No. 7:14-cv-00014, Aug. 11, 2014.

(56) References Cited

OTHER PUBLICATIONS

Defendants Preliminary Invalidity Contentions, Exhibit B27, Civil Action No. 7:14-cv-00014, Aug. 11, 2014.
Defendants Preliminary Invalidity Contentions, Exhibit C1, Civil Action No. 7:14-cv-00014, Aug. 11, 2014.
Defendants Preliminary Invalidity Contentions, Exhibit C2, Civil Action No. 7:14-cv-00014, Aug. 11, 2014.
Defendants Preliminary Invalidity Contentions, Exhibit C12, Civil Action No. 7:14-cv-00014, Aug. 11, 2014.
Defendants Preliminary Invalidity Contentions, Exhibit C18, Civil Action No. 7:14-cv-00014, Aug. 11, 2014.
Defendants Preliminary Invalidity Contentions, Exhibit C23, Civil Action No. 7:14-cv-00014, Aug. 11, 2014.
Defendants Preliminary Invalidity Contentions, Exhibit C24, Civil Action No. 7:14-cv-00014, Aug. 11, 2014.
Defendants Preliminary Invalidity Contentions, Exhibit C25, Civil Action No. 7:14-cv-00014, Aug. 11, 2014.
Jain et al., "The Design and Performance of MedJava," Proceedings of the 4$^{th}$ USENIX Conference on Object-Oriented Technologies and Systems (COOTS), Apr. 27-30, 1998.
J. Ahuja, "Client Server Applications in Java," PACE University, Thesis Masters of Science in Computer Science, Dec. 1997.
Gosling et al., "The Java™ Language Environment: A White Paper," Sun Microsystems, May 1996.
Wutka et al., "Java Expert Solutions," Web Based Programming Tutorials, 1997.
Petition for Inter Partes Review of U.S. Pat. No. 7,765,482, Case No. IPR2015-00686, Feb. 4, 2015.
Declaration of Petitioner's Expert Dr. Andrew Lippman, Case No. IPR2015-00686, Feb. 4, 2015.
Petition for Inter Partes Review of U.S. Pat. No. 7,765,482, Case No. IPR2015-00687, Feb. 4, 2015.
Declaration of Petitioner's Expert Dr. Andrew Lippman, Case No. IPR2015-00687, Feb. 4, 2015.
Petition for Inter Partes Review of U.S. Pat. No. 8,612,515, Case No. IPR2015-00683, Feb. 4, 2015.
Declaration of Petitioner's Expert Dr. Andrew Lippman, Case No. IPR2015-00683, Feb. 4, 2015.
Petition for Inter Partes Review of U.S. Pat. No. 8,612,515, Case No. IPR2015-00684, Feb. 4, 2015.
Declaration of Petitioner's Expert Dr. Andrew Lippman, Case No. IPR2015-00684, Feb. 4, 2015.
Petition for Inter Partes Review of U.S. Pat. No. 6,895,557, Case No. IPR2015-00680, Feb. 4, 2015.
Declaration of Petitioner's Expert Dr. Andrew Lippman, Case No. IPR2015-00680, Feb. 4, 2015.
Petition for Inter Partes Review of U.S. Pat. No. 6,895,557, Case No. IPR2015-00681, Feb. 4, 2015.
Declaration of Petitioner's Expert Dr. Andrew Lippman, Case No. IPR2015-00681, Feb. 4, 2015.
*Summit 6, LLC* v. *HTC Corporation et al.*, Declaration of Hsiwen Lo in Support of Defendants' Motion to Amend Preliminary Invalidity Contentions, Exhibit 9, Part 1, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 9, Part 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 9, Part 3, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 9, Part 4, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 10, Part 1, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 10, Part 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 10, Part 3, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 5, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 6, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 7, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 8, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 5, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 6, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 7, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 8, Civil Action No. 7:14-cv-00014-O, United States District Court for the Northern District of Texas Wichita Falls Division, Nov. 22, 2014.
Examiner's Answer in Ex Parte Reexamination for U.S. Pat. No. 7,765,482, Jan. 20, 2015.
Rose et al., NeXTSTEP Applications Manual, 1990.
*Summit 6, LLC* v. *HTC Corporation et al.*, Opening Claim Construction Brief of Plaintiff Summit 6, Civil Action No. 7:14-cv-00014-O, United States District Court for the Northern District of Texas Wichita Falls Division, Dec. 29, 2014.
*Summit 6, LLC* v. *HTC Corporation et al.*, Defendants' Opening Claim Construction Brief, Civil Action No. 7:14-cv-00014-O, United States District Court for the Northern District of Texas Wichita Falls Division, Dec. 30, 2014.
*Summit 6, LLC* v. *HTC Corporation et al.*, Amended Joint Claim Construction and Prehearing Statement, Civil Action No. 7:14-cv-00014-O, United States District Court for the Northern District of Texas Wichita Falls Division, Jan. 27, 2015.
*Summit 6, LLC* v. *HTC Corporation et al.*, Defendants' Motion to Amend Preliminary Invalidity Contentions, Civil Action No. 7:14-

(56) References Cited

OTHER PUBLICATIONS cv-00014-O, United States District Court for the Northern District of Texas Wichita Falls Division, Nov. 22, 2014.
*Summit 6, LLC* v. *HTC Corporation et al.*, Defendants' Memorandum in Support of Their Motion to Amend Preliminary Invalidity Contentions, Civil Action No. 7:14-cv-00014-O, United States District Court for the Northern District of Texas Wichita Falls Division, Nov. 22, 2014.
*Summit 6, LLC* v. *HTC Corporation et al.*, Appendix Two to Defendants' Motion to Amend Preliminary Invalidity Contentions, Civil Action No. 7:14-cv-00014-O, United States District Court for the Northern District of Texas Wichita Falls Division, Nov. 22, 2014.
*Summit 6, LLC* v. *HTC Corporation et al.*, Summit 6 LLC's Response to Defendants' Motion to Amend Preliminary Invalidity Contentions, Civil Action No. 7:14-cv-00014-O, United States District Court for the Northern District of Texas Wichita Falls Division, Dec. 15, 2014.
Petition for Inter Partes Review of U.S. Pat. No. 7,765,482, Case No. IPR2015-00685, Feb. 4, 2015.
Declaration of Petitioner's Expert Dr. Andrew Lippman, Case No. IPR2015-00685, Feb. 4, 2015.
Petition for Inter Partes Review of U.S. Pat. No. 7,765,482, Case No. IPR2015-00688, Feb. 4, 2015.
Declaration of Petitioner's Expert Dr. Andrew Lippman, Case No. IPR2015-00688, Feb. 4, 2015.
*Summit 6, LLC* v. *HTC Corporation et al.*, Declaration of Hsiwen Lo in Support of Defendants' Motion to Amend Preliminary Invalidity Contentions, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 3, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 1, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 3, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 4, Civil Action No. 7:14-cv-00014-O, United States District Court for the Northern District of Texas Wichita Falls Division, Nov. 22, 2014.
Petition for Inter Partes Review of U.S. Pat. No. 7,765,482, Case No. IPR2015-00806, Feb. 25, 2015.
Declaration of Petitioner's Expert Paul Clark, Case No. IPR2015-00806, Feb. 25, 2015.
Petition for Inter Partes Review of U.S. Pat. No. 8,612,515, Case No. IPR2015-00807, Feb. 25, 2015.
Declaration of Petitioner's Expert Paul Clark, Case No. IPR2015-00807, Feb. 25, 2015.

*Summit 6, LLC* v. *HTC Corporation et al.*, Defendants' Rule 12(c) Motion for Judgment on the Pleadings and Brief in Support, Civil Action No. 7:14-cv-00014-O, United States District Court for the Northern District of Texas Wichita Falls Division, Mar. 16, 2015.
*Summit 6, LLC* v. *HTC Corporation et al.*, Claim Construction Order, Civil Action No. 7:14-cv-00014-O, United States District Court for the Northern District of Texas Wichita Falls Division, Mar. 21, 2015.
Patent Owner's Preliminary Response for Inter Partes Review of U.S. Pat. No. 6,895,557, Case No. IPR2015-00680, May 19, 2015.
Patent Owner's Preliminary Response for Inter Partes Review of U.S. Pat. No. 6,895,557, Case No. IPR2015-00681, May 19, 2015.
Patent Owner's Preliminary Response for Inter Partes Review of U.S. Pat. No. 8,612,515, Case No. IPR2015-00683, May 19, 2015.
Patent Owner's Preliminary Response for Inter Partes Review of U.S. Pat. No. 8,612,515, Case No. IPR2015-00684, May 19, 2015.
Patent Owner's Preliminary Response for Inter Partes Review of U.S. Pat. No. 7,765,482, Case No. IPR2015-00685, May 19, 2015.
Patent Owner's Preliminary Response for Inter Partes Review of U.S. Pat. No. 7,765,482, Case No. IPR2015-00686, May 19, 2015.
Patent Owner's Preliminary Response for Inter Partes Review of U.S. Pat. No. 7,765,482, Case No. IPR2015-00687, May 19, 2015.
Patent Owner's Preliminary Response for Inter Partes Review of U.S. Pat. No. 7,765,482, Case No. IPR2015-00688, May 19, 2015.
Patent Owner's Preliminary Response for Inter Partes Review of U.S. Pat. No. 7,765,482, Case No. IPR2015-00806, Jun. 15, 2015.
Patent Owner's Preliminary Response for Inter Partes Review of U.S. Pat. No. 8,612,515, Case No. IPR2015-00807, Jun. 15, 2015.
Rimfire Functional Specification Version 1.0 Core Feature Set, revision 4, Apr. 12, 1999.
pbay Marketing Plan, PictureWorks Technology, Inc., Mar. 24, 1999.
White Paper, "Rimfire: The End-to-End Imaging Solution for Content Capture and Delivery," Internet Pictures Corporation, 2000.
Market Study, "Image Servers—Early Adopter Case Studies," Tony Henning and Future Image, Inc., 2001.
Press Release, "iPIX Acquisition Locks up Internet Picture Market," Mar. 9, 2000.
Press Release, "iPIX to Acquire PictureWorks Technology, Inc. to form End-to-End Internet Imaging Solutions Company," PictureWorks Technology, Inc., Mar. 8, 2000.
iPIX Presentation, "Enhancing Classified Advertising with Visual Data," Don Strickland and Sarah Pate, Oct. 2, 2003.
Woerner et al., "eBay for Dummies," Chapter 13, IDG Books Worldwide, Inc., 1999.
Press Release, "Admission Corp. Granted Web-Based Media Submission Patent," Admission Corporation, Jun. 2, 2005.
Press Release, "AdMission Directories Wins Gold at Yellow Pages Association Annual Industry Excellence Awards; Enhanced, Interactive Ads for IYP Recognized as Marketing Innovation," Business Wire, Mar. 14, 2005.
Overview of Enterprise Solutions, Executive Summary, PictureWorks, Aug. 18, 1998.
*Summit 6, LLC* v. *HTC Corporation et al.*, Defendants' Claim Construction Brief, Appendix Part 3, Civil Action No. 7:14-cv-00014-O, United States District Court for the Northern District of Texas Wichita Falls Division, Dec. 30, 2014.
*Summit 6, LLC* v. *HTC Corporation et al.*, Defendants' Claim Construction Brief, Appendix Part 4, Civil Action No. 7:14-cv-00014-O, United States District Court for the Northern District of Texas Wichita Falls Division, Dec. 30, 2014.
*Summit 6, LLC* v. *HTC Corporation et al.*, Plaintiff Summit 6, LLC's Responsive Claim Construction Brief, Civil Action No. 7:14-cv-00014-O, United States District Court for the Northern District of Texas Wichita Falls Division, Jan. 20, 2015.
*Summit 6, LLC* v. *HTC Corporation et al.*, Appendix in Support of Plaintiff Summit 6, LLC's Responsive Claim Construction Brief, Civil Action No. 7:14-cv-00014-O, United States District Court for the Northern District of Texas Wichita Falls Division, Jan. 20, 2015.
*Summit 6, LLC* v. *HTC Corporation et al.*, Defendants' Responsive Claim Construction Brief, Civil Action No. 7:14-cv-00014-O, United States District Court for the Northern District of Texas Wichita Falls Division, Jan. 20, 2015.

(56) References Cited

OTHER PUBLICATIONS

*Summit 6, LLC* v. *HTC Corporation et al.*, Corrected Appendix in Support of Plaintiff Summit 6, LLC's Responsive Claim Construction Brief, Civil Action No. 7:14-cv-00014-O, United States District Court for the Northern District of Texas Wichita Falls Division, Jan. 29, 2015.
*Summit 6, LLC* v. *HTC Corporation et al.*, Appendix in Support of Defendants' Reply Claim Construction Brief, Civil Action No. 7:14-cv-00014-O, United States District Court for the Northern District of Texas Wichita Falls Division, Feb. 3, 2015.
*Summit 6, LLC* v. *HTC Corporation et al.*, Defendants' Reply Claim Construction Brief, Civil Action No. 7:14-cv-00014-O, United States District Court for the Northern District of Texas Wichita Falls Division, Feb. 3, 2015.
*Summit 6, LLC* v. *HTC Corporation et al.*, Appendix in Support of Summit 6's Sur-Reply Claim Construction Brief, Civil Action No. 7:14-cv-00014-O, United States District Court for the Northern District of Texas Wichita Falls Division, Feb. 6, 2015.
*Summit 6, LLC* v. *HTC Corporation et al.*, Summit 6's Sur-Reply Claim Construction Brief, Civil Action No. 7:14-cv-00014-O, United States District Court for the Northern District of Texas Wichita Falls Division, Feb. 6, 2015.
*Summit 6, LLC* v. *HTC Corporation et al.*, Claim Charts, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Mark D. Selwyn in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Mark D. Selwyn in Support of Defendants' Rule 12(C) Motion for Judgment on the Pleadings, Exhibit A, Civil Action No. 7:14-cv-00014-O, United States District Court for the Northern District of Texas Wichita Falls Division, Mar. 16, 2015.
*Summit 6, LLC* v. *HTC Corporation et al.*, Declaration of David J. Silbert in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Philip Ou in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Jonathan E. Harris in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Appendix to Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Summit 6's Response to Defendants' Rule 12(C) Motion for Judgment on the Pleadings and Brief in Support, Civil Action No. 7:14-cv-00014-O, United States District Court for the Northern District of Texas Wichita Falls Division, Apr. 6, 2015.
*Summit 6, LLC* v. *HTC Corporation et al.*, Order, Civil Action No. 7:14-cv-00014-O, United States District Court for the Northern District of Texas Wichita Falls Division, May 28, 2015.
*Summit 6, LLC* v. *HTC Corporation et al.*, Transcript of Videotaped Deposition of Emery Berger, Ph.D., Civil Action No. 7:14-cv-00014-O, United States District Court for the Northern District of Texas Wichita Falls Division, Jan. 16, 2015.
*Summit 6, LLC* v. *HTC Corporation et al.*, Transcript of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 1 of Videotaped Deposition of Emery Berger, Ph.D., Civil Action No. 7:14-cv-00014-O, United States District Court for the Northern District of Texas Wichita Falls Division, Jan. 16, 2015.
*Summit 6, LLC* v. *HTC Corporation et al.*, Exhibit 1 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 3 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 4 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 5 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 6 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 7 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 8 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 9 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Expert Report of Dr. Tim A. Williams, Ph.D. on the Invalidity of U.S. Pat. No. 7,765,482, Civil Action No. 7:14-cv-00014-O, United States District Court for the Northern District of Texas Wichita Falls Division, May 8, 2015.
*Summit 6, LLC* v. *HTC Corporation et al.*, Defendants' Preliminary Invalidity Contentions, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A1, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A3, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A5, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A6, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A7, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A9, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A10, Civil Action No. 7:14-cv-00014-O, United States District Court for the Northern District of Texas Wichita Falls Division, Aug. 11, 2014.

(56) References Cited

OTHER PUBLICATIONS

*Summit 6, LLC* v. *HTC Corporation et al.*, Defendants' Preliminary Invalidity Contentions, Exhibit A11, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B3, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B4, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B5, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B6, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B7, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B8, Civil Action No. 7:14-cv-00014-O, United States District Court for the Northern District of Texas Wichita Falls Division, Aug. 11, 2014.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, vol. 1, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, vol. 2, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit I, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit J, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit K, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit L, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit M, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit N, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit O, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit P, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit Q, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit R, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit S, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit T, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit U, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit V, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, vol. 3, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, vol. 4, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit C, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit D, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit E, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit F, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit G, Civil Action No.

(56) References Cited

OTHER PUBLICATIONS

7:14-cv-00014-O, United States District Court for the Northern District of Texas Wichita Falls Division, May 8, 2015.
*Summit 6, LLC* v. *HTC Corporation et al.*, Expert Report of James A. Storer, Ph.D. Regarding Invalidity of the Asserted Claims of U.S. Pat. No. 7,765,482 and 8,612,515, Exhibit H, Civil Action No. 7:14-cv-00014-O, United States District Court for the Northern District of Texas Wichita Falls Division, May 8, 2015.
*Summit 6, LLC* v. *HTC Corporation et al.*, Invalidity of Representative Claims 38 and 13 of U.S. Pat. No. 7,765,482 Based on Axis Products, Civil Action No. 7:14-cv-00014-O, United States District Court for the Northern District of Texas Wichita Falls Division, Oct. 31, 2014.
*Summit 6, LLC* v. *HTC Corporation et al.*, Invalidity of Representative Claims 1 and 20 of U.S. Pat. No. 8,612,515 Based on Axis Products, Civil Action No. 7:14-cv-00014-O, United States District Court for the Northern District of Texas Wichita Falls Division, Oct. 31, 2014.
Axis 200+ Quick Installation Guide, Revision 0.9, Feb. 1998.
Axis 200 User's Manual, Revision 1.6, Oct. 1998.
Axis 240 Camera Server, 1998.
Axis 200+ and Axis 240 User's Guide, Revision 1.0, Jan. 1999.
AXIS 240 Quick Installation Guide, Revision 1.0, Feb. 1998.
AXIS 240 User's Manual, Revision 1.4, Nov. 1998.
Axis Communications, Remote Monitoring over Phone Lines for Alarm Verification, 1998.
AXIS 200+, Software Version 1.30, Feb. 4, 1998.
AXIS 240, Software Version 1.00, Feb. 26, 1998.
AXIS 240, Software Version 1.01, Mar. 19, 1998.
AXIS 240, Software Version 1.02, May 11, 1998.
Axis Communications, Camera Servers Bring Video Systems to the Internet, 1998.
Axis Communications, Financial Institutions, 1998.
Axis Communications, Weyerhaeuser—Remote Monitoring of Manufacturing Lines, 1998.
Axis Communications, Axis-Equipped Web Camera Sites, 1998.
Axis Communications, Network Camera Servers, 1998.
Axis Communications, The Axis 200+ Web Camera Has the Jaz, 1998.
Martin Gren, The History of Axis, Oct. 17, 2011.
AXIS 200, Software Version 1.30, Feb. 4, 1998.
AXIS NetEye 200 datasheet.D.
Mona R. Litt, ParentNet Preserves Parents' Peace of Mind, Jul. 15, 1997.
CCTV, Mar. 1, 1998.
*Summit 6, LLC* v. *HTC Corporation et al.*, Expert Report of Dr. Owen Astrachan Regarding the Invalidity of U.S. Pat. No. 7,765,482, Exhibit M, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-1, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-2, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-3, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-4, Civil Action No. 7:14-cv-00014-O, United States District for the Northern District of Texas Wichita Falls Division, May 8, 2015.
*Summit 6, LLC* v. *HTC Corporation et al.*, Expert Report of Dr. V. Michael Bove, Jr., Appendix C-5, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-6, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-7, Civil Action No. 7:14-cv-00014-O, United States District Court for the Northern District of Texas Wichita Falls Division, May 8, 2015.
Institution of *Inter Partes*Review of U.S. Pat. No. 8,612,515, Case No. IPR2015-00807, Sep. 9, 2015.
Institution of *Inter Partes*Review of U.S. Pat. No. 7,765,482, Case No. IPR2015-00806, Sep. 9, 2015.
Granting Motion to Stay *Ex Parte*Reexamination Control U.S. Appl. No. 90/012,987, Case No. IPR2015-00806, Sep. 9, 2015.
Petition for *Inter Partes*Review of U.S. Pat. No. 7,765,482, Case No. IPR2016-00029, Oct. 8, 2015.
Petitioner's Motion for Joinder in *Inter Partes*Review of U.S. Pat. No. 7,765,482, Case No. IPR2016-00029, Oct. 8, 2015.
*Summit 6, LLC* v. *Samsung Electronics Co., Ltd., and Samsung Telecommunications America, LLC*, Appeal Decision, No. 2013-1648, -1651, U.S. Court of Appeals for the Federal Circuit, Sep. 21, 2015.
*Summit 6, LLC* v. *HTC Corporation et al.*, Expert Report of Dr. V. Michael Bove, Jr., Appendix C-8, Civil Action No. 7:14-cv-00014-O, United States District Court for the Northern District of Texas Wichita Falls Division May 8, 2015.
*Summit 6, LLC* v. *HTC Corporation et al.*, Expert Report of Dr. V. Michael Bove, Jr., Appendix C-9, Civil Action No. 7:14-cv-00014-O, United States District Court for the Northern District of Texas Wichita Falls Division May 8, 2015.
*Summit 6, LLC* v. *HTC Corporation et al.*, Expert Report of Dr. V. Michael Bove, Jr., Appendix C-10, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-11, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-12, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-13, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-14, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-15, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-16, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-17, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-18, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-19, Civil Action No. 7:14-cv-00014-

(56) References Cited

OTHER PUBLICATIONS

O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-20, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-21, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-22, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-23, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-24, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-25, Civil Action No. 7:14-cv-00014-O, United States District Court for the Northern District of Texas Wichita Falls Division, May 8, 2015.
*Summit 6, LLC* v. *HTC Corporation et al.*, Defendants' Preliminary Invalidity Contentions, Exhibit B9, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B10, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B11, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B13, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B14, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B15, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B16, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B17, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B19, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B21, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B22, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B23, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B24, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B25, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C3, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C4, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C5, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C6, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C7, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C8, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C9, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C10, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C11, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C13, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C14, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C15, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C16, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit C17, Civil Action No. 7:14-cv-00014-O. United States District Court for the Northern District of Texas Wichita Falls Division, Aug. 11, 2014.
*Summit 6, LLC* v. *HTC Corporation et al.*, Defendants' Preliminary Invalidity Contentions, Exhibit C19, Civil Action No. 7:14-cv-

(56) References Cited

OTHER PUBLICATIONS

00014-O, United States District for the Northern District of Texas Wichita Falls Division, Aug. 11, 2014.

*Summit 6, LLC* v. *HTC Corporation et al.*, Defendants' Preliminary Invalidity Contentions, Exhibit C20, Civil Action No. 7:14-cv-00014-O, United States District for the Northern District of Texas Wichita Falls Division, Aug. 11, 2014.

*Summit 6, LLC* v. *HTC Corporation et al.*, Defendants' Preliminary Invalidity Contentions, Exhibit C21, Civil Action No. 7:14-cv-00014-O, United States District for the Northern District of Texas Wichita Falls Division, Aug. 11, 2014.

*Summit 6, LLC* v. *HTC Corporation et al.*, Defendants' Preliminary Invalidity Contentions, Exhibit C22, Civil Action No. 7:14-cv-00014-O, United States District for the Northern District of Texas Wichita Falls Division, Aug. 11, 2014.

*Summit 6, LLC* v. *HTC Corporation et al.*, Defendants' Preliminary Invalidity Contentions, Civil Action No. 7:14-cv-00014-O, United States District Court for the Northern District of Texas Wichita Falls Division, Sep. 3, 2014.

*Summit 6, LLC* v. *HTC Corporation et al.*, Defendants' Preliminary Invalidity Contentions, Civil Action No. 7:14-cv-00014-O, United States District Court for the Northern District of Texas Wichita Falls Division, Sep. 6, 2014.

*Summit 6, LLC* v. *HTC Corporation et al.*, Defendants' First Amended Preliminary Invalidity Contentions, Civil Action No. 7:14-cv-00014-O, United States District Court for the Northern District of Texas Wichita Falls Division, Jan. 12, 2015.

*Summit 6, LLC* v. *HTC Corporation et al.*, Exhibit B28 of Defendants' First Amended Preliminary Invalidity Contentions, Civil Action No. 7:14-cv-00014-O, United States District Court for the Northern District of Texas Wichita Falls Division, Jan. 12, 2015.

*Summit 6, LLC* v. *HTC Corporation et al.*, Exhibit C26 of Defendants' First Amended Preliminary Invalidity Contentions, Civil Action No. 7:14-cv-00014-O, United States District Court for the Northern District of Texas Wichita Falls Division, Jan. 12, 2015.

*Summit 6, LLC* v. *HTC Corporation et al.*, Expert Report of Dr. Owen Astrachan Regarding the Invalidity of U.S. Pat. No. 7,765,482, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit C, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit D, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit E, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit F, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit G, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit H, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit I, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit J, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit K, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit L, Civil Action No. 7:14-cv-00014-O, United States District Court for the Northern District of Texas Wichita Falls Division, May 8, 2015.

Patent Owner's Response for Inter Partes Review of U.S. Pat. No. 7,765,482, Case No. IPR2015-00806, Dec. 9, 2015.

Declaration of Paul Clark, Case No. IPR2015-00806 and IPR2015-00807, Nov. 18, 2015.

Declaration of Dr. Martin Kaliski, Case No. IPR2015-00806 and IPR2015-00807, Dec. 9, 2015.

Declaration of Sarah Pate, Case No. IPR2015-00806 and IPR2015-00807, Dec. 9, 2015.

Patent Owner's Response for Inter Partes Review of U.S. Pat. No. 8,612,515, Case No. IPR2015-00807, Dec. 9, 2015.

Corrected Petitioner's Reply to Patent Owner's Response in *Inter Partes* Review of U.S. Pat. No. 7,765,482, Case No. IPR2015-00806, Mar. 10, 2016.

Corrected Petitioner's Reply to Patent Owner's Response in *Inter Partes* Review of U.S. Pat. No. 8,612,515, Case No. IPR2015-00807, Mar. 10, 2016.

Petitioner's Reply to Patent Owner's Response in *Inter Partes* Review of U.S. Pat. No. 7,765,482, Case No. IPR2015-00806, Mar. 9, 2016.

Petitioner's Reply to Patent Owner's Response in *Inter Partes* Review of U.S. Pat. No. 8,612,515, Case No. IPR2015-00807, Mar. 9, 2016.

Declaration of Gary Frazier, Case Nos. IPR2015-00806 and IPR2015-00807, Feb. 19, 2016.

Transcript of Deposition of Scott Lewis, Case Nos. IPR2015-00806 and IPR2015-00807, Feb. 19, 2016.

Declaration of Scott Lewis, Case Nos. IPR2015-00806 and IPR2015-00807, Dec. 9, 2015.

Transcript of Deposition of Gary Frazier, Case Nos. IPR2015-00806 and IPR2015-00807, Mar. 29, 2016.

Transcript of Deposition of Sarah Pate, Case Nos. IPR2015-00806 and IPR2015-00807, Feb. 18, 2016.

Corrected Petitioner's Reply to Patent Owner's Response in *Inter Partes* Review of U.S. Pat. No. 7,765,482, Case No. IPR2015-00806, Apr. 1, 2016.

Corrected Petitioner's Reply to Patent Owner's Response in *Inter Partes* Review of U.S. Pat. No. 8,612,515, Case No. IPR2015-00807, Apr. 1, 2016.

Declaration of Gary Frazier, Case Nos. IPR2015-00806 and IPR2015-00807, Mar. 9, 2016.

Decision, Institution of *Inter Partes* Review, Motion for Joinder, Case No. IPR2016-00029, Apr. 4, 2016.

\* cited by examiner

Host Service Transaction Flow

MIRROR Service Transaction Flow

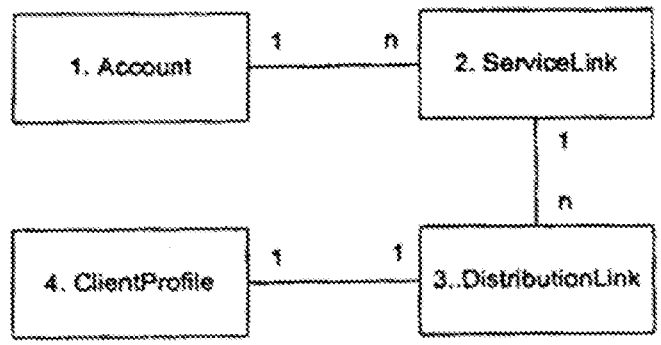

*MIRROR Service Entities*

FIG. 12

```
public boolean BindMediaItem(
int          mediaType,       // jpg image = 1, others not defined
             String   fileName,         // item was saved on disk here
             String   mediaGroupID,     // (e.g., MLS number)
             String   mediaExtID,       // (e.g., zipcode)
             int      seqNum,           // image sequence number in group (1-based)
             int      industryCode,     // NAICS industry code of image submitter
             String   desc1,            // e.g., for real estate could be room name
             String   desc2,            // ""
             String   desc3             // ""
) throws SQLException // This is where you update the
// proprietary database with the information
// passed in above from PictureWorks
```

FIG. 13

MEDIA ACQUISITION, PROCESSING AND DISTRIBUTION SYSTEM FOR THE INTERNET

This application is a continuation of non-provisional application Ser. No. 12/790,442, filed May 28, 2010 (Now U.S. Pat. No. 8,392,532), which is a continuation of non-provisional application Ser. No. 11/935,340, filed Nov. 5, 2007 (Now U.S. Pat. No. 7,761,537), which is a continuation of non-provisional application Ser. No. 10/736,285, filed Dec. 15, 2003 (Now U.S. Pat. No. 7,313,604), which is a continuation of non-provisional application Ser. No. 09/440,461, filed Nov. 15, 1999 (Now U.S. Pat. No. 6,732,162). Each of the applications and patents identified above is incorporated by reference herein, in its entirety, for all purposes.

BACKGROUND OF THE INVENTION

1. Field of the Invention

The present invention relates to the acquisition, processing and distribution of media objects on the Internet and, more particularly, to such systems for use in applications wherein there are multiple originators of media objects that will be viewed in multiple web sites having different viewing requirements.

2. State of the Art

Much of the phenomenal success of the Web is attributable to its graphical nature. Literally, a picture is worth a thousand words. The capture of digital images has become routine, using digital cameras (still and video) and scanners. Nevertheless, although the handling of images by Web site creators has achieved a high degree of automation, for the average user manipulating and sharing digital images over the Internet remains a cumbersome and daunting process. Piecemeal solutions that have been devised for handling digital images require a level of sophistication that is beyond that of the ordinary user. Additionally, where automated solutions do not exist, time consuming and error-prone human and manual intervention are required to manipulate or share images. Such manual intervention for transferring a digital image may include, for example, first downloading a FTP program, then installing it, then running it and connecting it to an FTP server by typing the server name in the connection dialog, then navigating to the proper subdirectory, selecting the files to be uploaded, making sure that the program is in binary transfer mode, then sending the files. For the average user, such an involved process is a disadvantage.

Additionally, as technologies advance and casual users begin to experiment with other image types, such as streaming video, 3D objects, slide shows, movies, and accompanying sound files, the processes required to share these rich media types on the Internet becomes exponentially more complicated and prohibitive. As the realization of the Internet as an interactive, content rich medium becomes more and more a reality, the need for enabling the acquisition and distribution of rich content and media on the Internet will become the gating factor to its long-term success.

Once specific application of handling media over the Internet is in the real-estate market. It has been reported that over 25% of prospective residential home-buyers use the Internet as a means for locating properties of potential interest. There are many web sites dedicated to this purpose, including major real estate portals (e.g., Realtor.com and HomeAdvisor), national and regional brokerages, and individual realtor or broker web sites, to name a few. To be effective, these sites must provide rich visual content in the form of images of the properties listed. The image content can take the form of a single still image, multiple still images, slide shows comprised of a sequence of still images, immersive images (360 degree views), and video tours. These images can also have audio associated with them. The term media object is used generically herein to refer to all types of such images, including audio and graphic objects.

While anyone can access the Internet through a browser, getting images posted to the Internet is a complicated process generally requiring a high degree of technical proficiency and specialized software tools. It is even more difficult when the media objects are of multiple types (still images, immersive images, video, etc.) and are created by different originators. For example, a real estate listing might include an image captured by a multiple listing service photographer, an immersive image captured by a professional photographer, and multiple still images taken by the real estate agent herself. Add to this the fact that all of these media objects need to be displayed on multiple web sites that will have different viewing requirements. For example, a national real estate portal may only accept still images of a certain size and quality, say 300.times.200 pixels at a jpeg compression setting of 60%, while an agent=s individual web site may require a 390.times.260 pixel representation of the images at a different quality setting. Additionally, different browser versions have different viewing requirements for certain media object types. It is apparent that the problems associated with acquiring media objects from multiple sources and distributing them in the required form to multiple destination web sites are complex.

There are web sites today that offer a subset of this functionality specifically in the on line photo sharing market. These sites allow users to store their personal photographs, display them in a thumbnail or larger view and invite family and friends to view the pictures. These photo sharing sites let users upload digital pictures directly or have film processed and then posted to the web site. The purpose of these sites is to accommodate image uploads from many users within a proprietary system and where the image destination is intended to stay within that system.

The present invention teaches a Media Acquisition, Processing and Distribution (MAPD) system that solves many of the problems of handling media over the internet such as encountered in the real-estate market and photo sharing market. The Media Acquisition, Processing and Distribution (MAPD) system of the present invention has three major components: (1) media acquisition, (2) media processing and (3) media distribution (via hosting or mirroring). The purpose of the MAPD system is to enable multiple users without computer expertise to easily submit media objects that after appropriate processing in accordance with pre-defined requirements, are viewable on multiple web sites.

The MAPD system of the present invention specifically handles image upload within an open system and that system is designed to process and distribute media objects outside of itself, to be viewed in multiple web sites having different viewing requirements such as desired in the real-estate market. Additionally, the system of the present invention is designed such that the proprietary systems used in the photo sharing sites are unique to each web site and are not designed to be deployed across several web sites, markets or partners. Finally, the MAPD system of the present invention is designed to be used by varying and different web sites across many markets and partners. One important aspect of the MAPD system is its API or abstraction layer that specifically allows multiple web sites to integrate the MAPD system functionality.

SUMMARY

The present invention, generally speaking, provides a broad-based solution for the acquisition, processing and automatic distribution of media objects via the Internet in a manner that does not require a high degree of technical proficiency. Specifically, the present invention provides a media acquisition, processing and distribution system for media objects submitted by multiple users for viewing within a plurality of destination web sites that have different media object viewing requirements. The invention provides means for each of the originators to associate one or more local media objects with a media object interface within a browser. Means are provided for storing information that defines the media object viewing requirements for each of the destination web sites. A remote server or servers receives the media objects from each originator and, based on the information stored in the database, processes the media objects in accordance with the media object viewing requirements of the destination web sites. In a hosting configuration, the remote server(s) send a URL to each destination web site that links the site back to the processed media object for viewing. In a mirroring configuration, the remote server(s) distribute the processed media objects to the destination web site servers.

In accordance with a further aspect of the present invention, within the MAPD client/server architecture, means are provided for intelligently processing the media objects both on the client and server, thereby enabling a more efficient use of bandwidth.

BRIEF DESCRIPTION OF THE DRAWINGS

The invention may be further understood from the following description in conjunction with the appended drawings. In the drawing:

FIG. 12 is a diagram illustrating relationships between mirror service entities; and FIG. 13 is a method called when a new media object arrives at a client site.

DETAILED DESCRIPTION

The following description describes a system for MAPD that enables the acquisition, processing and distribution of media objects from multiple users to multiple viewing web sites on the Internet. The term media object as used herein refers broadly to any form of digital image or graphical file, including still images, PDF files, video images, audio, slide shows, etc. Although in the following description the submission and processing of still images is described in greatest detail, the same principles apply equally to media objects of all descriptions and apply equally to groups of multiple images.

The MAPD system of the present invention is for use in those applications wherein multiple users of the system have a need to submit media objects for viewing on multiple destination web sites that, in general, have different viewing requirements. The term viewing requirements refers broadly to the various and unique ways media objects are displayed by web sites. Each web site places different technical requirements and constraints on the way that site uniquely displays media objects and therefore allows for viewing of media objects by visitors to the site. In accordance with the present invention, means are provided in the form of a prepare and post tool for each of the originators of media objects to associate one or more media objects with a media object identifier on a locally viewable web page, and for uploading the media object or objects to at least one remote server. A database stores information that defines the media object viewing requirements for each of the destination web sites. Within the MAPD client/server architecture, either on the client or server, the MAPD system processes the input media objects to meet the viewing requirements that are specified for each of the destination web sites. Such processing may take the form of image resizing, reformatting (changing the file format), encoding in the case of video, specifying media object storage location and browser version support just to name a few. The MAPD system then either delivers a media object URL to the destination web sites (hosting service) or transfers the processed media objects to the destination web sites ready for viewing (mirroring service). Specifically, the hosting service delivers a media object URL to a web page, allowing the media object to be requested by a customer web site and served by the MAPD system. The mirroring service delivers the actual media object, or other related data such as a media object URL, to a remote database to be served by the host of the destination web site.

Using MAPD system, end users can submit media objects in an immediate and intuitive manner. No technical sophistication is required. In particular, understanding technical terms such as JPEG, resolution, pixel, kilobyte, transfer protocol, IP address, etc., is not required, since the MAPD system automatically and transparently handles all of these tasks for the end user.

Figure 1:
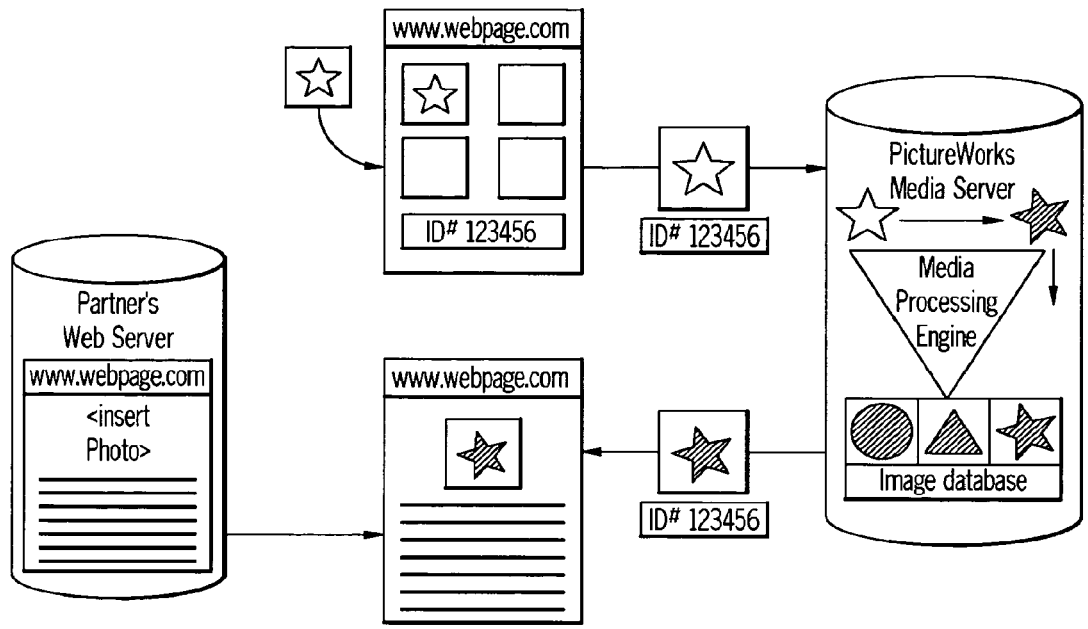
FIG. 1 is a diagram illustrating information flow in accordance with one aspect of the invention.

For on-line commerce customers dealing with high transaction load web sites, hosting is appealing. The MAPD system hosting service allows these customers to incorporate rich media (where rich media can be generally defined as combinations of different media objects such as pictures, movies, sound clips, etc.) into interactive web sites. The MAPD system hosting service provides this rich media to web sites without requiring that they bear the overhead costs associated with hosting the media objects on their own servers or without the technical expertise required to process and create rich media. Referring to FIG. 1, the MAPD system hosting service entails the following step-by-step process:

1. A media object is submitted by an end user (originator) dragging content into a MAPD system customer's web page. Media object ID data is also collected.
2. The media object may be pre-processed, such as converted, reduced, enhanced, etc., on the client within the MAPD client/server architecture.
3. The media object is uploaded into the MAPD system with ID information.
4. The media object is processed by the MAPD system in accordance with a profile that represents the requirements of the destination web sites. The requirement data is stored in a database and the media object is stored on a file server.
5. The MAPD system transparently returns a URL (representing the media object location) to the customer's web page. The media object source URL is embedded in the HTML in the customer's web page and returned to the customer's web server.
6. A hit by an end user (requester) to the MAPD system customer's web page where the media object source URL is embedded causes the customer's server to request insertion of the media object hosted from the MAPD system.
7. The requested media object is served by the MAPD system and integrated into the customer's web page in real time as the web page draws.
8. The end user's (requestor's) browser presents the finished web page to the end user.

Figure 2:
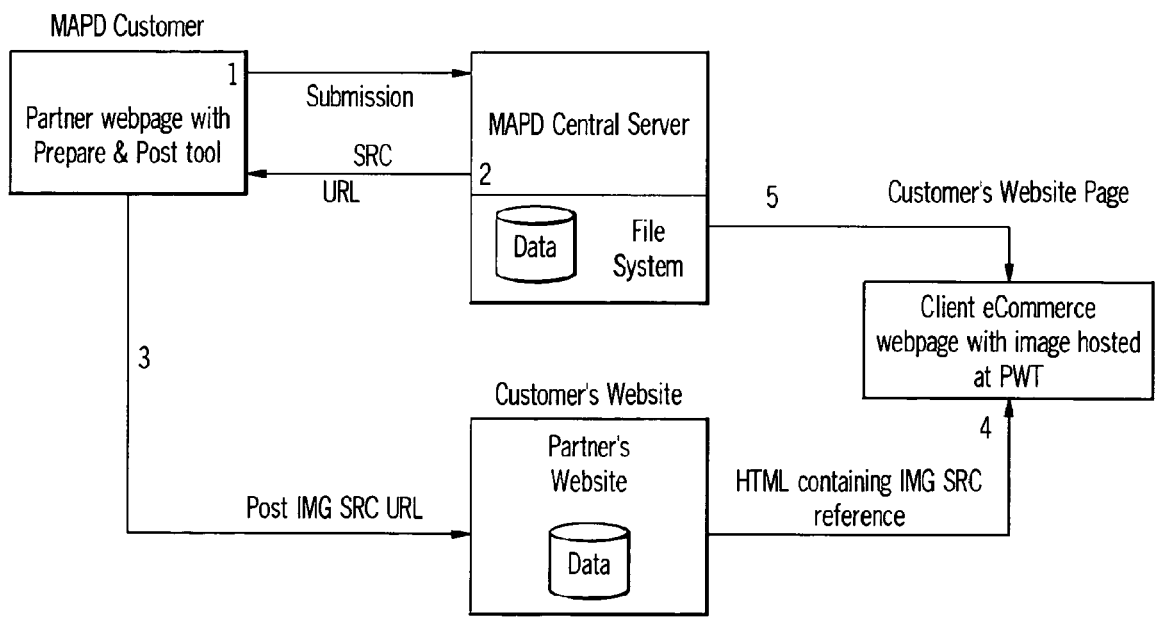
FIG. 2 is a more detailed block diagram corresponding to the diagram of FIG. 1.

Transaction flow for the host service may be further appreciated with reference to FIG. 2. Transaction flow begins with a MAPD system customer's web page having embedded in it the prepare and post tool. The prepare and post tool is represented on the web page as a media object identifier into which the user drags and drops a selected media object. The media object identifier may take the form of a Java applet, an ActiveX control, etc. The function of the identifier is to receive a media object, display a thumbnail or visual representation of the media object, and (optionally) perform preprocessing of the media object. A separate component may be used to upload the media object in response to the user clicking on a Send button. In an exemplary embodiment, clicking on the Send button activates a COM component of the prepare and post tool, called the Media Sender, for uploading the media object to the MAD system (step 1).

The MAPD system includes processing capabilities in the form of a "media processing engine" and media object storage including a database and a file system (e.g., file server). When media objects are received, they are "logged" into the database, processed if required, and stored in the file system. As shown in step 2, a media object source URL (IMG SRC URL) is returned to the end user (originator) machine that was used to view the customer's web page. The IMG SRC URL is in turn sent with accompanying form data to the destination web site (step 3).

At the destination web site, a web page is created having HTML that contains the IMG SRC reference. For example, the web page may describe a real estate listing and the media object may be an image of the property being listed. When an end user requests to view the web page (a hit to the web page occurs), HTML containing the IMG SRC URL is delivered to the end user's (requestor=s) computer from the destination web site. The media object itself is delivered separately from the MAPD system but at the same time the destination web page is served (step 5).

Figure 3:
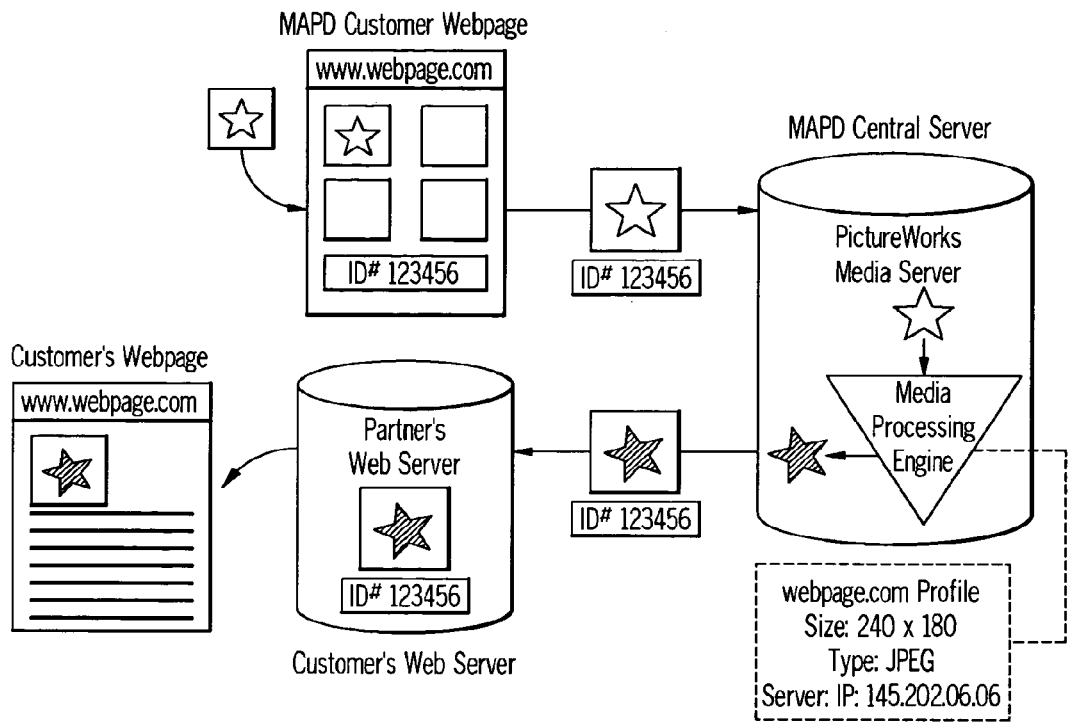
FIG. 3 is a diagram illustrating information flow in accordance with another aspect of the invention.

Some customers may prefer to host media objects on their own servers. In this instance, a MAD system mirroring service is used. Referring to FIG. 3, the media object mirroring service entails the following steps:

1. A media object is submitted by an end user (originator) dragging content into a MAPD system customer's web page. Media object ID data is also collected.
2. The media object may be pre-processed, such as converted, reduced, enhanced, etc.
3. The media object is uploaded to the MAPD system with ID information.
4. The media object and data are received by the MAPD system and the data is stored in a database while the media object is stored on a file server.
5. A request is placed in the distribution queue notifying the servers that additional processing and preparation may then be required prior to sending.
6. The media object is processed in accordance with a profile that represents the viewing requirements of the destination web sites and the processed media object is distributed to the customer's web server (second location) or to other web servers (e.g., customer affiliate locations) approved by the customer.
7. The media object and ID information are received by the second location and are processed by the customer's servers so that the ID information is automatically stored in a database and the media object is stored in accordance with predetermined instructions per the second location.
8. When an end user (requestor) hits the customer's web sites that contain media objects from the MAPD system, the web sites and media objects are served from the customer's web server.

Figure 4:
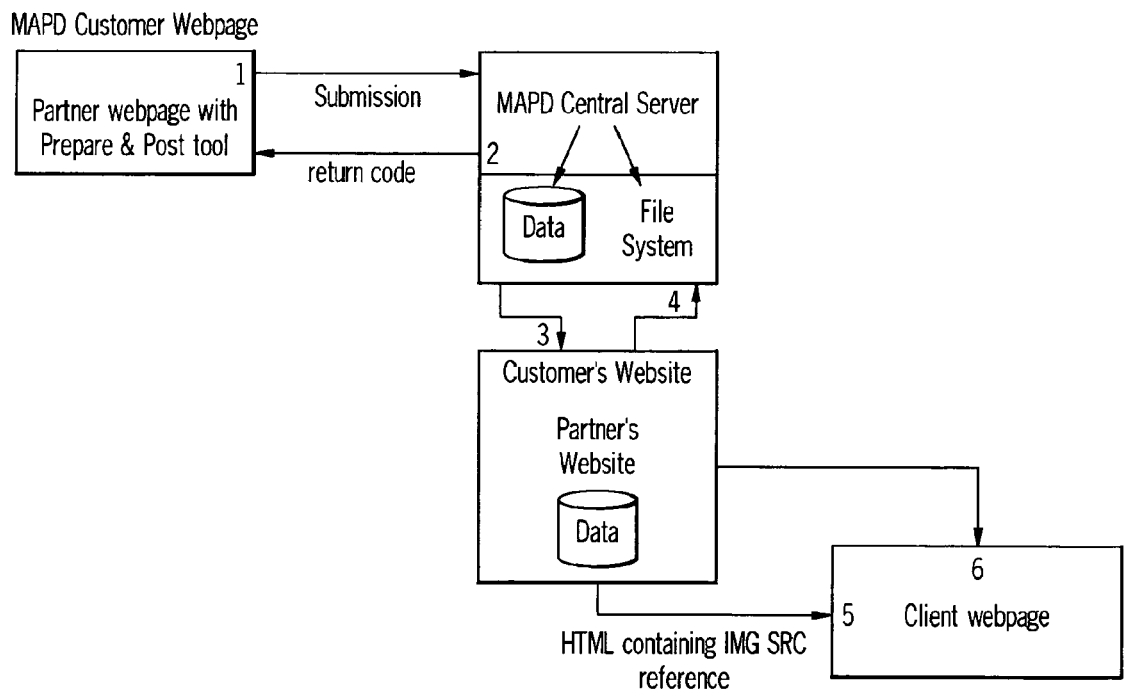
FIG. 4 is a more detailed block diagram corresponding to the diagram of FIG. 3.

Transaction flow for the mirror service may be further appreciated with reference to FIG. 4. As in the case of the hosting service, transaction flow for the mirroring service begins with a MAPD system customer web page having embedded in it the prepare and post tool, represented as a media object identifier. The end user drops a selected media object into the media object identifier and clicks on the Send button, sending the media object to the MAPD system central server (step 1). A return code is returned (step 2) to the COM component indicating whether or not submission has been successful.

On central servers within MAPD system, the media object is processed in accordance with a stored customer profile. The media object is then sent directly (step 3) to the customer's web site servers, where it is stored. A return code is returned (step 4) to the MAPD system indicating success or failure of media object transfer to the destination web sites.

As in the case of the hosting service, at each destination web site, a web page is created having HTML containing the IMG SRC reference. However in most mirroring scenarios, different from the hosting service, when an end user (requester) hit to the web page occurs, the web page and media object are delivered directly from the customer's servers (steps 5 and 6).

Another implementation of mirroring may not send the media object itself to the MAPD system customer or customer affiliate locations. Other data that references the media object, such as the IMG SRC URL, may be distributed directly to the customer's servers and automatically integrated with web page data. The URL in hosting is returned immediately to the web page where the submission originates. The URL in mirroring is forwarded to another server (second location) not related to the web page where the submission originates. In this instance, the media object will be served from the MAPD system.

Figure 5:
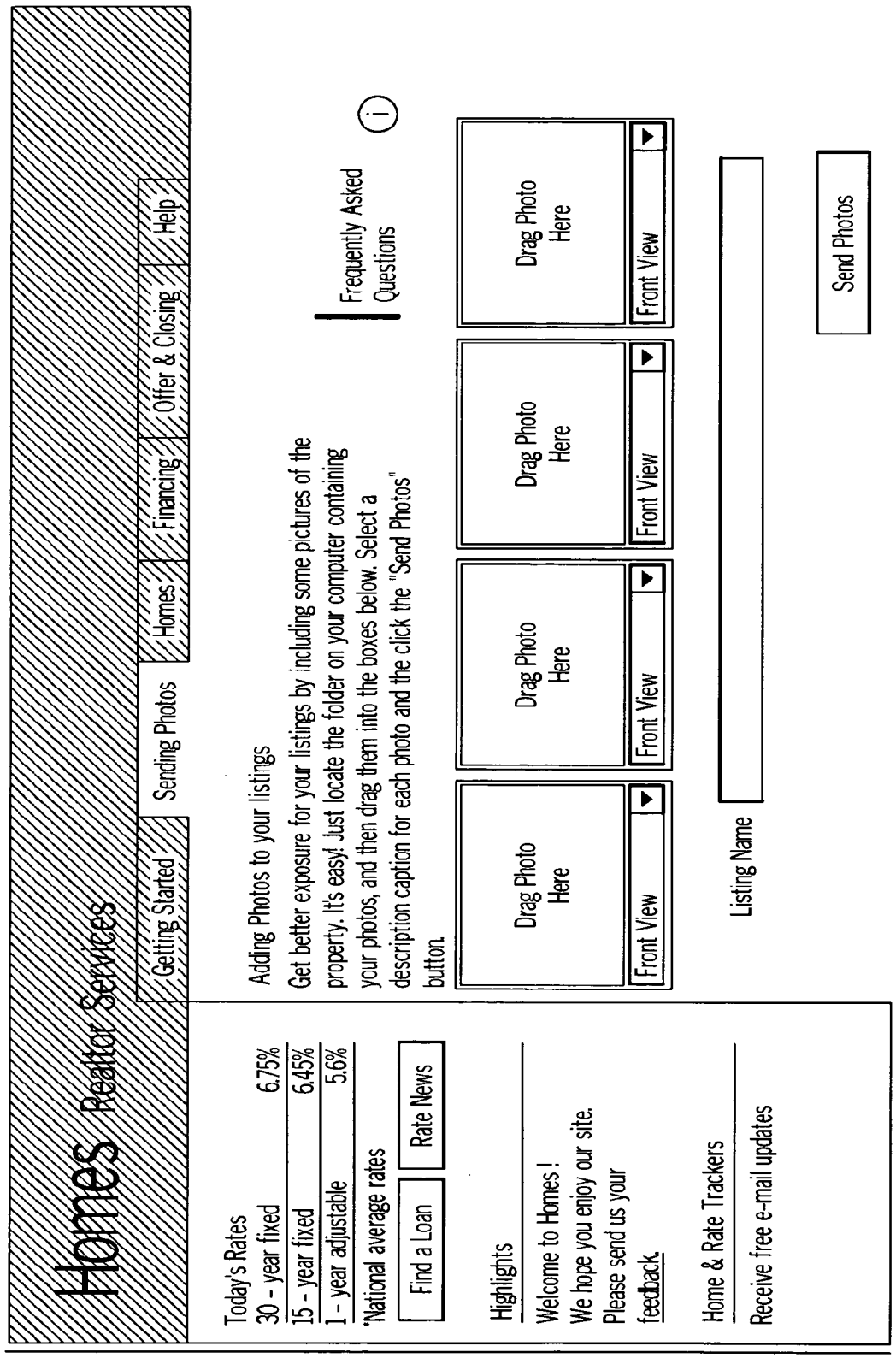
FIG. 5 is a diagram of an exemplary Web page providing image acquisition functions.

Referring to the real estate industry example stated earlier, FIG. 5, is an example of a realty web page featuring the described prepare and post functionality of the MAPD system. The end user (originator) drags and drops photos into media object identifiers and selects appropriate captions for the media object, e.g., living room, family room, etc. The captions may be typed in or selected from menus. The end user also supplies identifying information, in this instance the multiple listing service number. When the end user clicks the Send Photos button, the media objects are processed and transported immediately according to the configuration of the tool and in accordance with the hosting service or the mirroring service previously described.

There are three ways media objects become associated with a media object identifier. The first is through a "drag and drop" behavior where the user clicks on a media object to select the one they want to submit. The media object is then dragged to the media object identifier. Releasing the mouse button associates the media object with the media object identifier. This behavior is allowed in web browsers that support drag and drop functionality. The prepare and post tools enable these browsers to accept media objects via drag and drop by providing the media object identifier as an ActiveX component.

The second way to associate a media with the media object identifier is to click on the media object identifier to browse for media objects, then select the media object of choice. This method is made available for web browsers where the media object identifier needs to be a pure Java component. (Such as "signed applet browsers" like Netscape Navigator). In this instance, the user may be asked to choose a media object in a similar manner as when choosing a file to be opened, either by graphical navigation or by specifying a path name. For example, a prompt associated with the media object identifier may be displayed prompting the user to click within the media object identifier. Clicking within the media object identifier brings up a browse dialog. Using the browse dialog, the user selects the desired media object, which is then placed in the media object identifier. The prepare and post tools will generate a visual representation or thumbnail of the media object, a feature currently not available in signed applet browsers.

A variation of the second way to associate a media object with the media object identifier involves support for older browser versions, also referred to as minimal browsers. Browsers in this category include versions 2.X and 3.X. Also considered part of the minimal browser category are all browsers used on the Macintosh platform. To accommodate complex file sending requirements from within minimal web browsers, the MAPD system implements media object sending through the alternate HTTP channel using the HTML<FILE>element. Once the end user (originator) clicks to send the media object, it is converted to a multi-part mime format for sending to the MAPD system central servers.

The prepare and post tool also supports a batch interface, allowing a plurality of media objects to be batched and submitted simultaneously. Most users who are using media objects work with several media objects at the same time versus one media object at a time. Therefore, it is desirable to submit 5, 10 or 25 media objects for processing and distribution at one time for efficiency without having to repeat steps for each of the media objects. An example is a professional photographer who may need to submit several media objects at the same time to several destination web sites. Quickly clicking and dragging a plurality of media objects for submission with the MAPD system is as easy and efficient as submitting one media object.

The description of the present invention thus far has discussed that a media object can be obtained from a single source or from multiple origination sources and that a media object can be transmitted to a single destination and to multiple destinations. The point-to-multi-point distribution is a key advantage of the present invention. This multi-point distribution may be accomplished using distribution lists stored at MAPD system central servers. Distribution lists stored within the MAPD database provide a way for MAPD system customers to specify which of their affiliate web sites get mirrored copies of images submitted through the mirror service distributed directly to them. In technical terms, a distribution list is a named entity that binds a group of destination web sites with a customer via the mirror service. When a media object arrives from a customer on the mirror service, the MAPD system uses the customer's named distribution list to establish which web site servers (i.e., customer affiliate locations) receive copies of the media object. FIG. 12 shows this point-to-multi-point distribution relationship as it is managed by the service link and the distribution list, as will be described herein below.

Each entity in a distribution list has an associated client profile that identifies the remote servers for the destination web sites, the delivery method and any number of processing filters to apply to the media object before sending. Filters are used to control the attributes of media object content delivered to clients, which are tied to the customer profiles. Filters can also be employed to increase functionality within the MAPD system architecture. The attributes may include dimensions, quality and type of media object delivered (i.e., slide show, video) etc. Filters are applied to inbound media objects or outbound media objects or both and are used for both the MAPD system host and mirror service.

More particularly, filters may be associated with both services and clients. Service filters are applied as the media object is received. For mirror services, the service filter is applied as the media object arrives, before it is stored. As the mirror service distributes the media object to clients, the appropriate filter for each client is applied before the media object is sent. For example, a particular mirror service may convert all images to 320.times.200 jpeg before storing them, and then convert those to the specific requirements of each client on its distribution list prior to transporting the images. For the hosting service, the service filter is applied as the media object is received, and then the appropriate client filter is applied to the result before the media object is stored. Clients and services can share filters. If no filters associated with a given service or client handle a particular file type, then media objects with that file type are not converted for that service or client.

Depending on the particular service, image processing may be performed primarily at the client using the prepare and post tool, primarily at a MAPD system central server, or may be performed at both, some at the client and some at the MAPD system central server. In the case of the host service, for example, image requirements may be specified within a particular instance of the prepare and post tool as it is integrated into the web page of a particular customer. Processing the image within the prepare and post tool avoids unnecessary data transfer. In the case of the mirror service, for example, more than one processed image may be produced from the original image submission. Image processing may therefore be performed primarily at the central server. Nevertheless, basic sizing and resampling may be performed at the client, avoiding the circumstance in which a novice user attempts to upload a huge image file, causing their network connection to "choke."

Although media processing will often involve sizing and formatting of images, any of various kinds of media processing may be performed by the MAPD system media processing engine, for example enhancements and effects, text and graphic layering, image stitching, streaming video encoding, producing zoomable images, cropping, rotating, etc.

For instance, in one embodiment, resizing and format conversion of still images may be performed on either the client or central server. In another embodiment video image encoding may be performed on either the client or central server. In still another embodiment, still images are resized by determining on the central server a maximum still image size for all destination web sites such that the still images are resized no larger than the maximum size on the central server. In this case, resizing of the image may also be performed on the client.

Furthermore, although the MAPD systems have been described as having a central server, any suitable server architecture may be used to support MAPD system services. One type of architecture that is complementary to MAPD system services is a distributed server architecture and global content distribution service offered by Akamai Technologies, Inc. of Cambridge, Mass. under the name Freeflow™. The Freeflow content distribution method allows content providers to ensure rapid access to their sites without needing to maintain burdensome and expensive content distribution infrastructure, using a global network of specialized servers and software that controls how content is distributed throughout the network. Rapid access is achieved by moving bandwidth-intensive content closer to the user. Web site performance is optimized by migrating content according to its popularity while taking into account changing network conditions and fluctuations in traffic. The MAPD system may optionally pass information to this distributed server environment or others, as needed, in order to optimize delivery of the media content the MAPD system creates.

Figure 6:
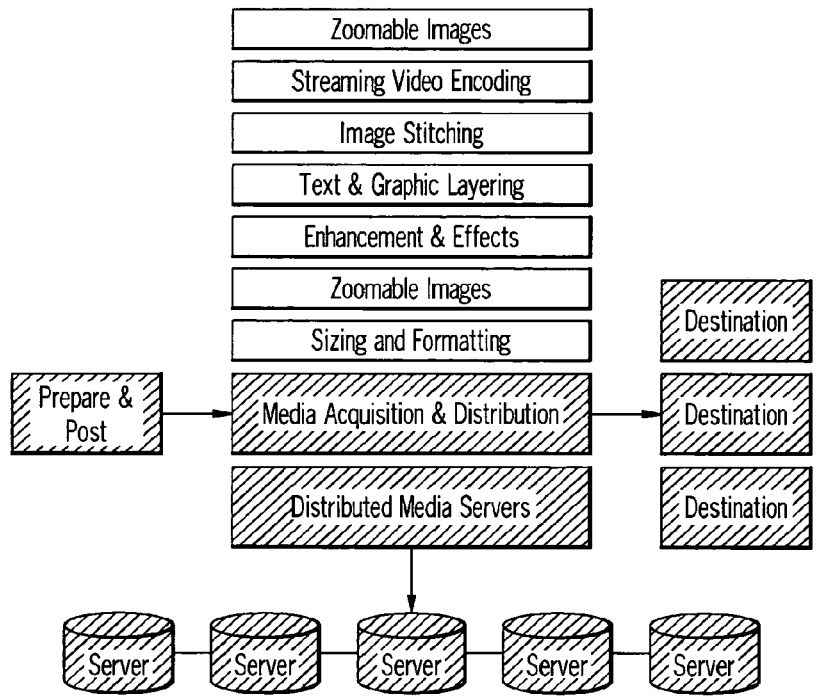
FIG. 6 is a conceptual block diagram of the MAPD system network imaging system work flow and media processing engine scalability.

Referring to FIG. 6 therefore, a block diagram of the MAPD system network imaging architecture is shown. A MAPD system Media Acquisition and Distribution layer (MAPD system central server) provides for media object processing in accordance with customer profiles, and for multi-point distribution as described. Above the MAPD system Media Acquisition and Distribution layer may be various service layers including zoomable images, streaming video encoding, image stitching, slide shows, text and graphic layering, enhancement and effects, sizing and formatting. The architecture is easily extended by added new services as needed. Below the MAPD system Media Acquisition and Distribution layer is the optional distributed server infrastructure, which may be a global hosting infrastructure such as that of Akamai or any other advantageous server infrastructure partner.

Figure 7:
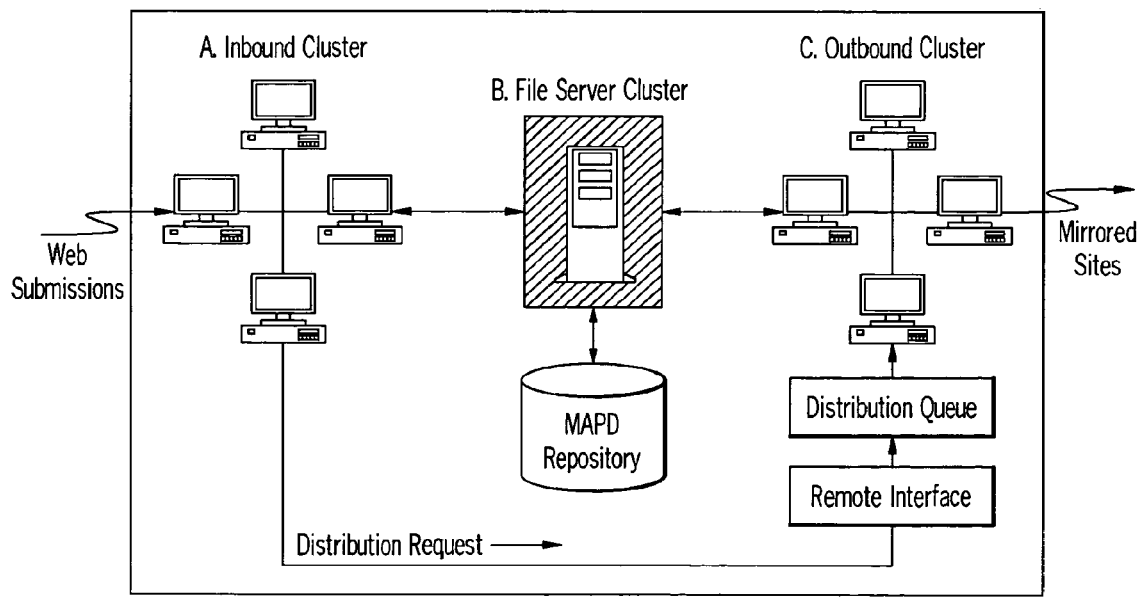
FIG. 7 is a system block diagram of the hardware partition for MAPD system network imaging system mirroring service.

Recognizing that any of various server infrastructures may be used, the MAPD system central hardware architecture in accordance with an exemplary embodiment of the invention will be described. Referring to FIG. 7, an example of how the MAPD system mirroring system hardware could be partitioned is detailed. A cluster organization is followed that uses three clusters, an inbound cluster, a file server cluster and an outbound cluster. The file server cluster is attached to a MAPD system database, or repository. Web submissions from the MAPD system prepare and post tool are received by the inbound cluster. Within the inbound cluster, the MAPD system repository is consulted in order to form a distribution request, which is sent to a distribution queue at the outbound cluster through a remote interface. Within the outbound cluster, distribution requests are polled and processed by picking up items from the distribution queue and building a distribution list based on the corresponding customer's profile. For each destination in the distribution list, a distribution server within the outbound cluster makes a socket connection to the second location and delivers the media object.

Figure 8:
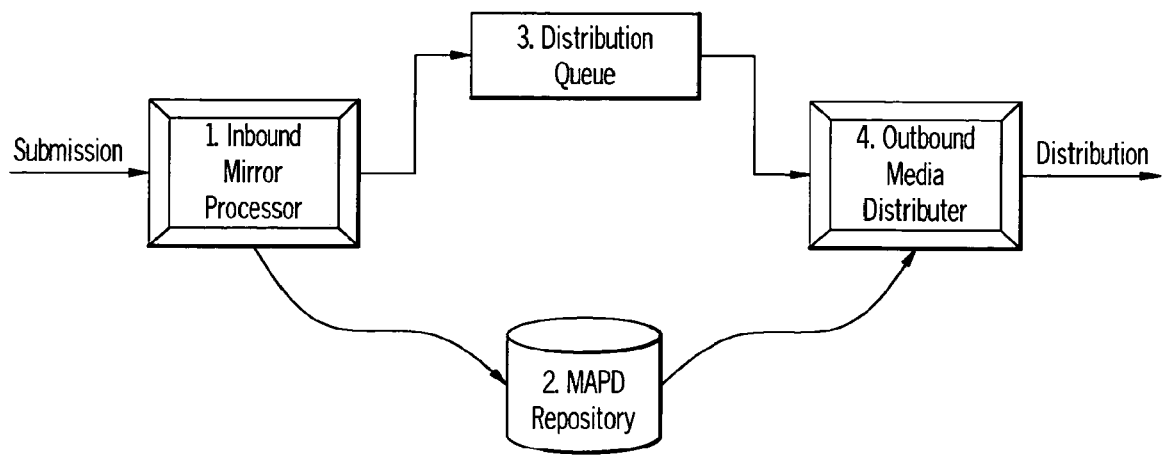
FIG. 8 is a diagram showing the relationship of certain areas of the mirroring service.

Because of the ability to have a media object sent to multiple destinations, the number of outbound transactions is potentially far greater than the number of inbound transactions. To facilitate the transfer of media objects, inbound media processing is separated from outbound media processing. This separation is accomplished by the MAPD system distribution queue. In an exemplary embodiment, the MAPD system distribution queue is a runtime Remote Method Invocation (RMI) object shared between multiple MAPD systems and outbound distribution processors. Referring more particularly to FIG. 8, when a submission arrives for the mirror service, it is received by an inbound mirror processor. The inbound mirror processor stores the submission within the MAPD system repository and adds a distribution object to the distribution queue. The outbound media distributor constantly polls the distribution queue for available items and when one is available, removes it from the queue and carries out the distribution. A single inbound submission to the mirror service typically results in multiple distributions to customer affiliate locations, since the purpose of the mirror service is to allow MAPD system customers to distribute media to that customer's affiliates using a distribution list. Once the outbound media distributor pulls an item off the distribution queue, it is responsible to build a distribution list of all intended recipients and carry out the transfer of media.

A ClientHoldingQueue object may be provided as a holding area for transactions destined for a customer which is unreachable. These transactions are queued as distribution objects until the customer becomes reachable and they can be sent. A ClientHoldingQueue contains a queue of distribution objects similar to the primary queue. It has its own thread to process that queue and it contains the ability to ping its customer as a way of knowing when the customer comes back on line. ClientHoldingQueues are created whenever a normal transmission fails and they go out of existence as soon as they are able to deliver all of their queued objects.

Figure 9:
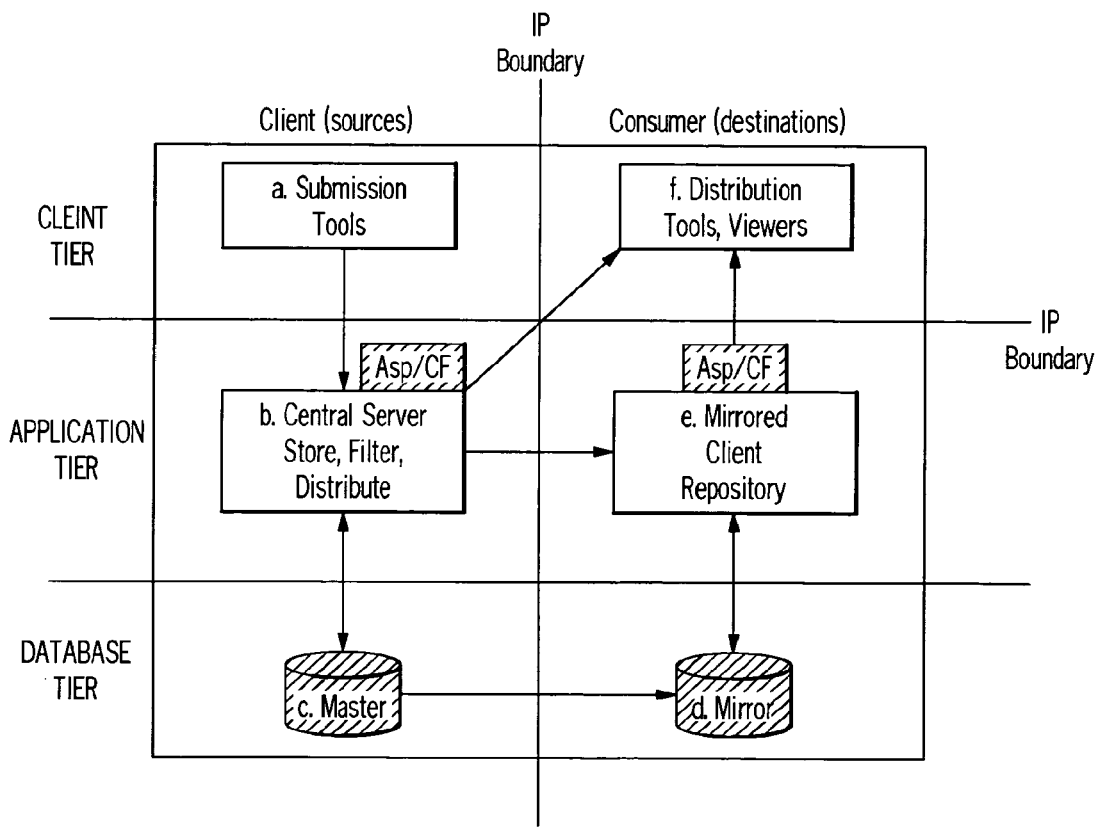
FIG. 9 is a diagram illustrating three-tier partitioning of the network imaging system.

The MAPD system may be realized in two tiers (traditional client/server), three tiers, or, more generally, N tiers. A three-tier implementation in accordance with an exemplary embodiment of the invention is illustrated in FIG. 9. The three-tier partitioning includes a client tier, an application tier and a database tier. Beside tier boundaries, also identified are IP (internet protocol) boundaries. Communication across IP boundaries occurs, for example, through the Internet using the Internet Protocol (IP). A vertical IP boundary separates client (sources) from consumers (destinations). A horizontal IP boundary separates (browser-based) client from servers.

In operation, submission tools (prepare and post) are used to submit media to a central server where the media objects are processed as necessary, stored, and distributed, either by hosting or mirroring. In the case of mirroring, the outbound servers send the media object to a mirrored client repository, causing the media object to be stored within a mirrored database. The media object is accessed from the mirrored client repository using distribution tools and viewers, in particular web browsers. Such access may be accomplished, for example, through Active Server Pages (ASP) or Cold Fusion (CF) for server-side page generation. In the case of hosting, the media object is accessed directly from the MAPD system central servers, using the same or similar techniques, for example.

Figure 10:
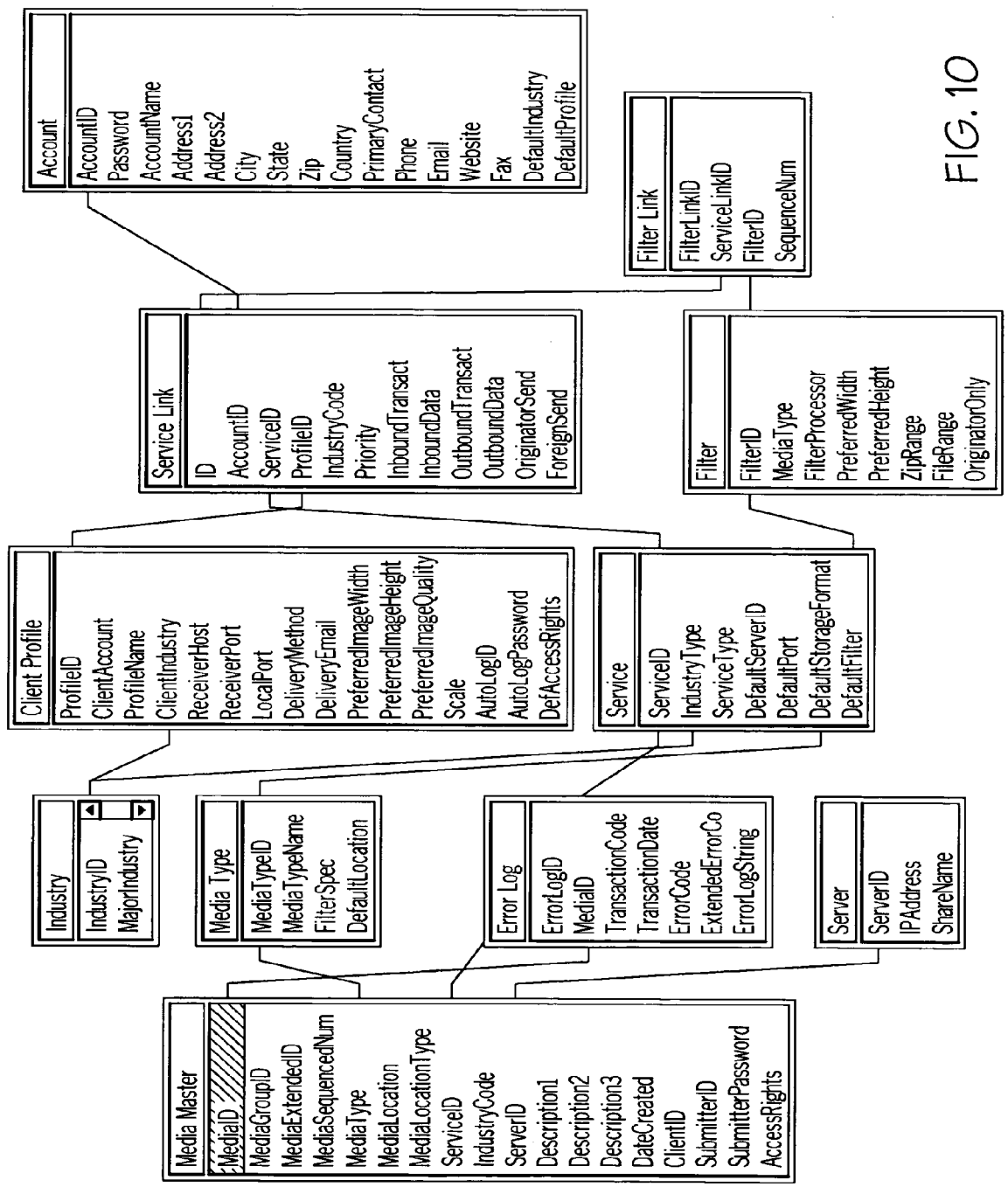
FIG. 10 is an entity/relationship diagram of the database of FIG. 9.

Referring to FIG. 10, the principal MAPD system database system entities (tables) and their relationships are shown in accordance with an exemplary embodiment. Appendix A details the associated database tables. The Account table contains primary account information for each MAPD system service customer. There is only one account record for each MAPD system customer. The ClientProfile table contains profile information used to control customer access to MAPD system services. A MAPD system customer will typically have a single client profile, but may in some instances have more than one customer profile, e.g., if a customer has multiple business units, one or more of which subscribes to MAPD system services. The user table defines users with access rights to account information for a given customer.

The Distribution Link table is used to identify a distribution list associated with the mirror service via a ServiceLink record. The ServiceLink.DistributionListname and the ServiceLink.ServiceLinkID are used to identify all the DistributionLink records that are targeted for a media distribution to a second location. Each DistributionLink record identifies a profile (DistributionLink.ProfileID) which identifies the second location for the distribution as well as media distribution characteristics (e.g., filter, applications, etc.).

The Server table identifies various MAPD systems used to process inbound traffic, outbound traffic and media storage. The ErrorLog table records errors in inbound and outbound traffic processing.

The Storage Volume table contains descriptions of MAPD system central server volumes used for media storage. A given service uses a Storage Volume record to identify the server and volume where media will be stored. The physical and virtual paths used to identify the folder location for media items are identified via a StorageLink record in the StorageLink table. The StorageLink table contains physical and virtual folder locations within a given StorageVolume. It is used for identifying the storage location of media items within the MAPD system central server.

The MediaMaster table contains one entry for each unique media element stored in the MAPD system repository. The MediaType table identifies classes of media associated with MAPD system services. The Industry table describes industries associated with MAPD system customers. It may be based on the NAICS industry codes standard.

The Service table describes all available MAPD system services. The ServiceLink table contains associative records which identify customer-specific service characteristics or properties associated with a given service. The Filter table contains filter records. Each filter record defines activities or constraints applied to media. The FilterLink table contains associative records which identify filters associated with a given customer.

Further details concerning MAPD system filters and their implementation is found in Appendix B.

Figure 11:
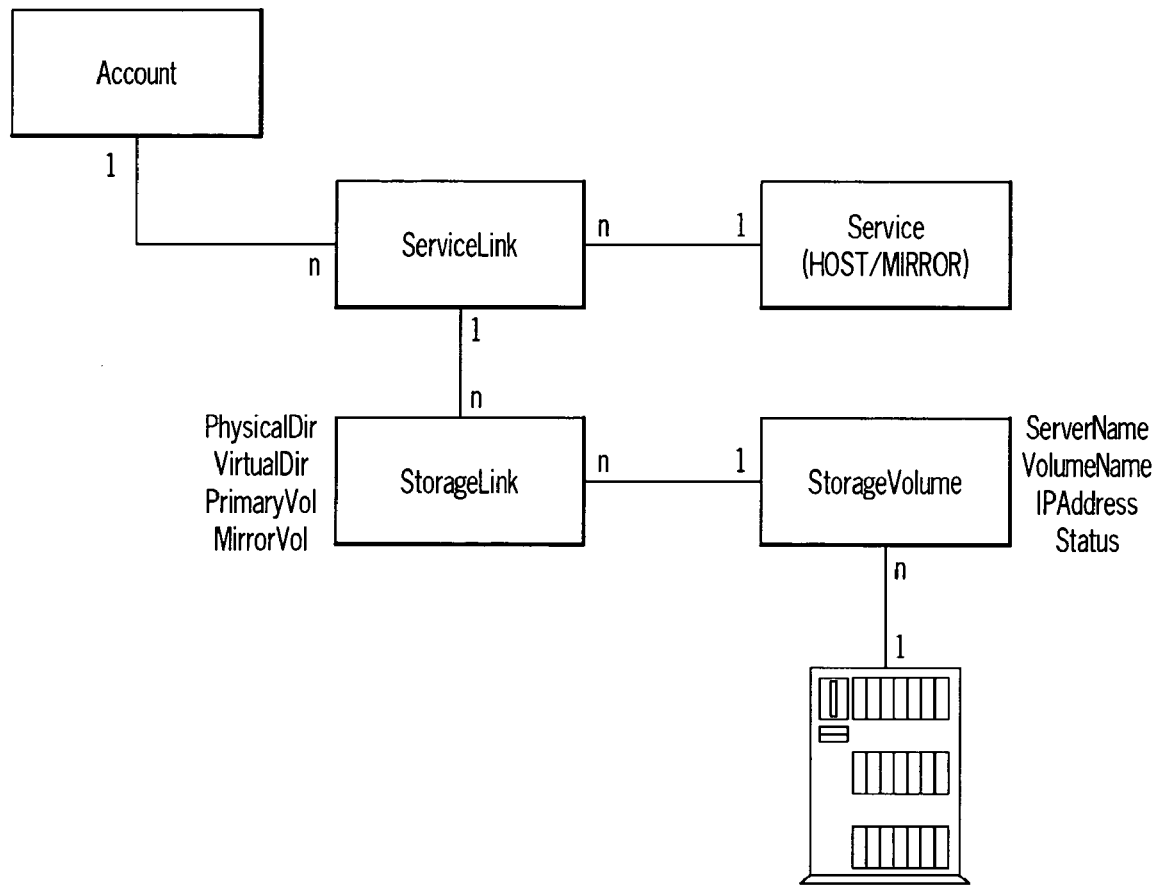
FIG. 11 is a diagram illustrating relationships between account, service and storage entities.

As illustrated in FIG. 11 in general terms, ServiceLinks link an Account to one or more services and ultimately, through StorageLink and StorageVolume entities, to a physical media storage location.

In the case of the mirror service, DistributionLink and ClientProfile entities control the distribution process as illustrated in FIG. 12. When a submission arrives for the mirror service, it is stored within the MAPD system central repository and mirrored to a customer (second location) or customer affiliate locations. The second location and the affiliate locations use MAPD system software, particularly a MAPD system ClientReceiver, to process and store media objects and data. When the media object submission arrives the userID and password are used to lookup the associated Account (1) record. Once the account has been identified, the AccountId and service name (in this instance "MIRROR") are used to find the ServiceLink (2) record associated with the account for the mirror service. The ServiceLink record identifies the distribution list to mirror the submission to. Given a ServiceLinkID and a DistributionName, the DistributionLink (3) table is used to identify the target ClientProfile (4) records used to mirror the submission. The ClientProfile (4) record contains the IP address and port of the mirror site (second location).

The MAPD system communicates with clients to send mirrored media objects through TCP/IP sockets. A MAPD system ClientReceiver is a software agent that sits at the customer site and waits (e.g., on a pre-defined port) for connections from the MAPD system. In an exemplary embodiment, the port is stored with the customer profile in the MAPD system repository and fetched by the media distributor to make the customer connection. Other delivery methods may be used instead of sockets, e.g., HTTP filesend, FTP push, e-mail etc.

In order to effectively use the media objects, to match media objects with customer's databases, customers need to be able to automatically integrate incoming media objects (received from MAPD system distribution servers) into their existing database structures. In an exemplary embodiment, a method shown in FIG. 13 is called when a new media object arrives at the customer site (remote destination web site) via the MAPD system ClientReceiver. The ClientReceiver automatically takes the media object that has been sent from MAPD system central and stores it to disk (i.e., line "String filename," in FIG. 13). The storage location is specified in a properties file at the customer's receiving site. The ClientReceiver also passes the information about the media object (unique ID number, sequence number, description fields, etc.) to a function which can be modified at the customer's receiving location as well (i.e., lines "String mediaGroupID", "String media ExtID", "int seqNum", "int industry Code", "String Desc1", "String desc2", and "String desc3", in FIG. 13). The MAPD system provides a function that can be modified to provide the customer's own database with the information the MAPD system passed to the function. Once the new media object has been integrated into the customer's database, it can be immediately used in server-side page generation as a page is requested by a web site visitor.

The function typically stores the media object information in a proprietary database (the MAPD system customer's database). The body of the function is commented out so the customer or the customer's affiliate locations can fill it out with specific instructions (source code to the Java class that contains this function is provided by the MAPD system). The function parameters reflect what was provided during the media object submission using the image submission tool.

MAPD system customers who subscribe to the "mirror" service specify their own servers or affiliate server locations who are approved to receive mirrored copies of the media objects or information about the media objects, such as IMG SRC URL, from the MAPD system. To specify which affiliates receive mirrored information, a distribution list is set up and a small profile is entered for each affiliate in the database. The initial steps for setting up a customer for the mirror service are:

1. A registration form is completed that contains standard entries such as an ID, password, full name, address, phone, e-mail, fax, etc. MAPD system central server uses this information to establish a service record(s) for the customer account.
2. Distribution list forms are completed for each approved affiliate or customer server and appropriate information such as IP address to send images to, transformations to be performed on media objects etc. MAPD system central server uses this information to establish a profile for each affiliate.

The profile contains the preferred delivery method (ClientReceiver, e-mail or FTP for the mirror service.) For delivery by the ClientReceiver, the entry contains the IP address and Port for the ClientReceiver.

The MAPD system ClientReceiver is provided to the customer and, in an exemplary embodiment, is a Java application or process that runs on any platform supporting the generic JDK 1.1 or later versions. The ClientReceiver sits on one of the customer's remote web servers or one or more customer's affiliate locations per the customer's designation. When media objects are received by MAPD systems from the prepare and post media submission tools, they are processed according to the customer's specifications as described earlier and forwarded to any approved affiliate locations by making a socket connection to ClientReceivers installed on the customer's behalf.

In the case where the affiliate locations intended for mirrored delivery cannot install the ClientReceiver or they prefer delivery by a different method, the media object submissions can alternatively be forwarded via other methods such as FTP or by e-mail. The MAPD system is set up to specify delivery instructions by any number of methods including but not limited to ClientReceiver, FTP or e-mail on an affiliate-by-affiliate basis. For example, if Customer #1 wants media objects to be sent to 3 affiliates in a distribution list called "PrimaryAffiliates" (and there can be more than one distribution list), tables at MAPD system central may be set up for delivery by ClientReceiver to the first affiliate, FTP to the second and e-mail to the third. The MAPD system can be configured to have unique and varied distribution lists per the customer's instructions.

The following Appendices C and D describe in greater detail the program architecture for the Image Container (media object identifier) and COM (media sender) components used in an exemplary embodiment of the invention. Appendix E is a general description of the ClientReceiver class used in an exemplary embodiment of the invention.

What is claimed is:

1. A method, comprising:
receiving, from a client computing device, one or more files that have been processed at said client computing device, wherein each of the one or more files is one of an image file, video file and audio file;
in response to said receiving, processing said received one or more files in accordance with a first profile associated with a first of a plurality of computing devices to produce a first version of the one or more files for inclusion in a first destination web site, said first profile containing first size and format requirements of said first destination web site, and processing said received one or more files in accordance with a second profile associated with a second of said plurality of computing devices to produce a second version of the one or more files for inclusion in a second destination web site, said second profile containing second size and format requirements of said second destination web site; and
transmitting, by a server device to said first and said second of said plurality of computing devices that are remote from said client computing device and said server device, said first and said second versions of the one or more files, respectively.

2. The method of claim 1, wherein said receiving comprises receiving, from said client computing device, one or more files that have been pre-processed at said client computing device in accordance with pre-processing parameters.

3. The method of claim 1, wherein said processing comprises resizing, cropping or rotating content in a file.

4. The method of claim 1, wherein said processing comprises encoding content in a file.

5. The method of claim 1, wherein said processing comprises reformatting a file.

6. The method of claim 1, wherein said processing comprises enhancing or adding an effect to content in a file.

7. A device, comprising:
a receiver configured to receive, from a client computing device, one or more files that have been processed at said client computing device, wherein each of the one or more files is one of an image file, video file and audio file;
a processor that is configured to retrieve, in response to said receiving, a first profile associated with a first of a plurality of computing devices and a second profile associated with a second of said plurality of computing devices from memory storage, process said one or more files in accordance with said first profile to produce a first version of the one or more files for inclusion in a first destination web site, said first profile containing first size and format requirements of said first destination web site, and process said one or more files in accordance with said second profile to produce a second version of the one or more files for inclusion in second destination web site, said second profile containing second size and format requirements of said second destination web site; and
a transmitter that is configured to transmit to said first and said second of said plurality of computing devices that are remote from said client computing device and said server device, said first and said second versions of the one or more files, respectively.

8. The device of claim 7, wherein said receiver is configured to receive, from said client computing device, one or more files that have been pre-processed at said client computing device in accordance with pre-processing parameters.

9. The device of claim 7, wherein said processor is configured to resize, crop or rotate content in a file.

10. The device of claim 7, wherein said processor is configured to encode content in a file.

11. The device of claim 7, wherein said processor is configured to reformat a file.

12. The device of claim 7, wherein said processor is configured to enhance or add an effect to content in a file.

13. The device of claim 7, wherein said processor processes said one or more files in accordance with said first profile and said second profile prior to storage by the device.

14. The method of claim 1, wherein said processing occurs prior to storage of the received one or more files.

15. The method of claim 1, further comprising retrieving said first profile and said second profile from memory storage in response to said receiving.

\* \* \* \* \*